United States Patent [19]

Ford et al.

[11] Patent Number: 4,595,433
[45] Date of Patent: Jun. 17, 1986

[54] APPARATUS FOR HEAT SEALING THERMOPLASTICS STRAPS

[75] Inventors: Graham Ford, Cambridge; Donald Sutehall, Harlow, both of England

[73] Assignee: Gerrard Industries Limited, South Yorkshire, England

[21] Appl. No.: 702,124

[22] Filed: Feb. 15, 1985

[30] Foreign Application Priority Data

Feb. 16, 1984 [GB] United Kingdom ............... 8404062

[51] Int. Cl.⁴ .................................................. B32B 31/00
[52] U.S. Cl. ........................................ 156/64; 53/582; 100/33 PB; 156/358; 156/499; 156/502; 156/510
[58] Field of Search ............... 156/502, 499, 358, 350, 156/510, 64; 100/33 PB; 53/382

[56] References Cited

U.S. PATENT DOCUMENTS

| | | | |
|---|---|---|---|
| 3,397,105 | 8/1968 | Takami | 100/33 PB |
| 3,841,055 | 10/1974 | Takami | 156/475 X |
| 4,288,270 | 9/1981 | Mossell | 100/33 PB |
| 4,504,353 | 3/1985 | Ford | 100/33 PB |

Primary Examiner—David Simmons
Attorney, Agent, or Firm—Oblon, Fisher, Spivak, McClelland & Maier

[57] ABSTRACT

Apparatus and methods for heat sealing thermoplastics strap material comprising a portable tool adapted to receive two sections of strap material which are to be welded together and having a heating element, means for moving the heating element between the straps and a battery source for supplying heating current to the heating element. A control circuit detects the battery voltage on load, and a drive circuit controls the movement of the heating element between the straps, to control the speed of the heating element in dependence on the detected voltage level, to compensate for decreasing battery voltage. The battery source is mounted in or on the tool housing for portability.

The heating element is mounted on a carriage assembly mounted for reciprocal motion between the two straps and driven by an electric motor.

A shaft encoder associated with the carriage drive generates electrical pulses the frequency of which is proportional to the speed, and the number of which is proportional to the distance moved by the carriage.

Switch means is employed for turning the heating current on and off and is actuated by the presence of the heater carriage assembly at particular positions along the carriage assembly path, determined by microswitches or counting the pulses from the encoder.

16 Claims, 31 Drawing Figures

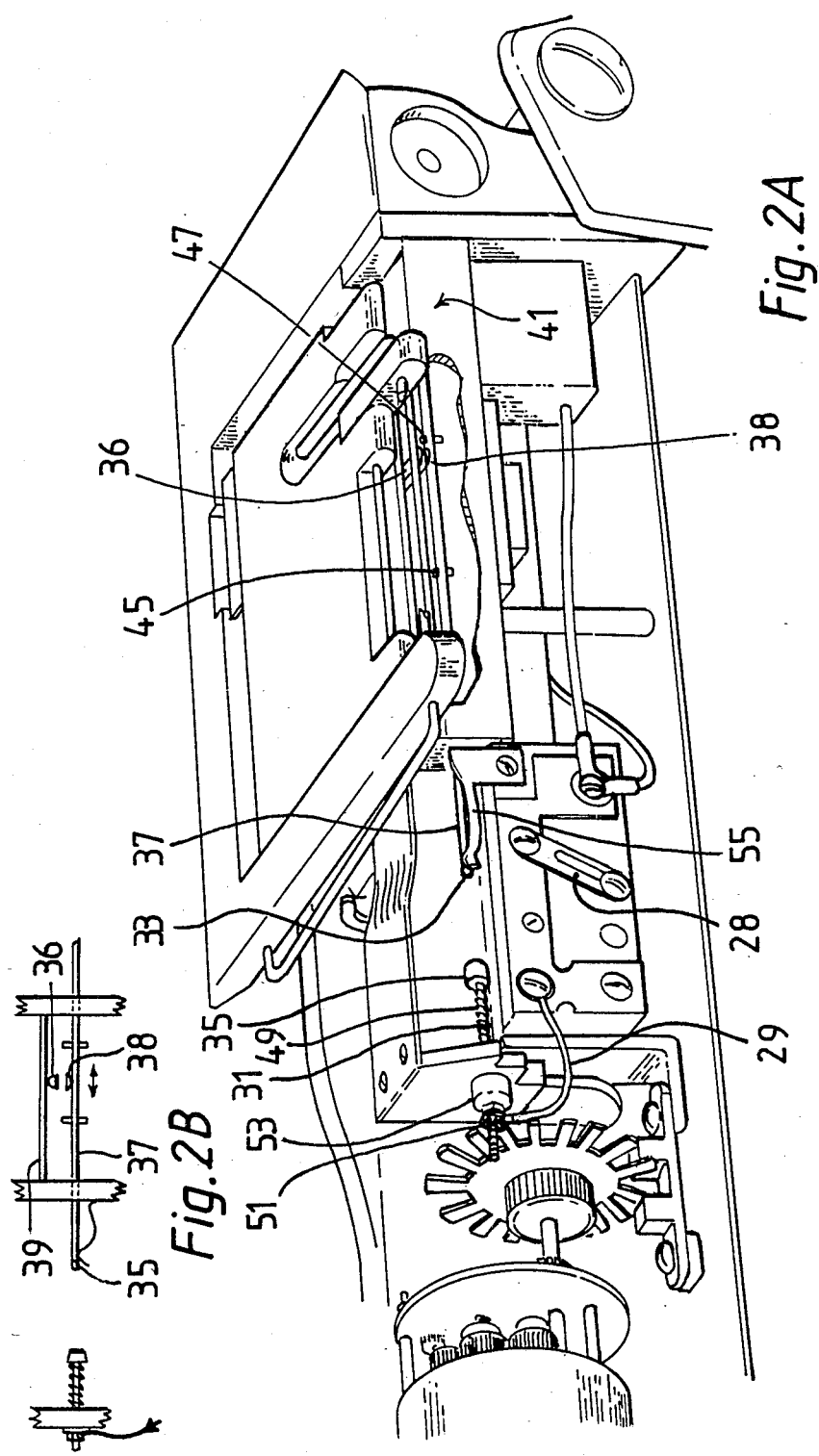

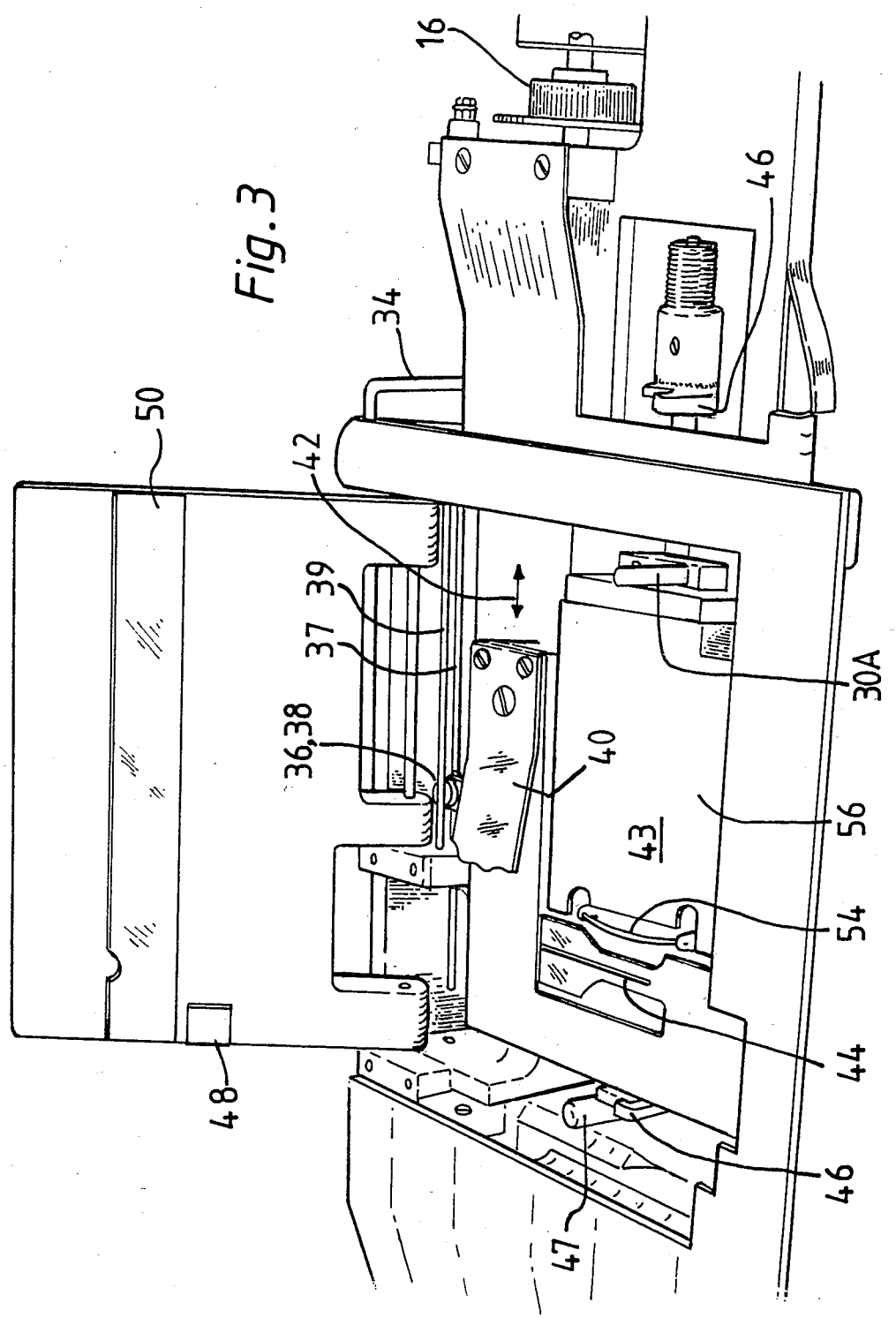

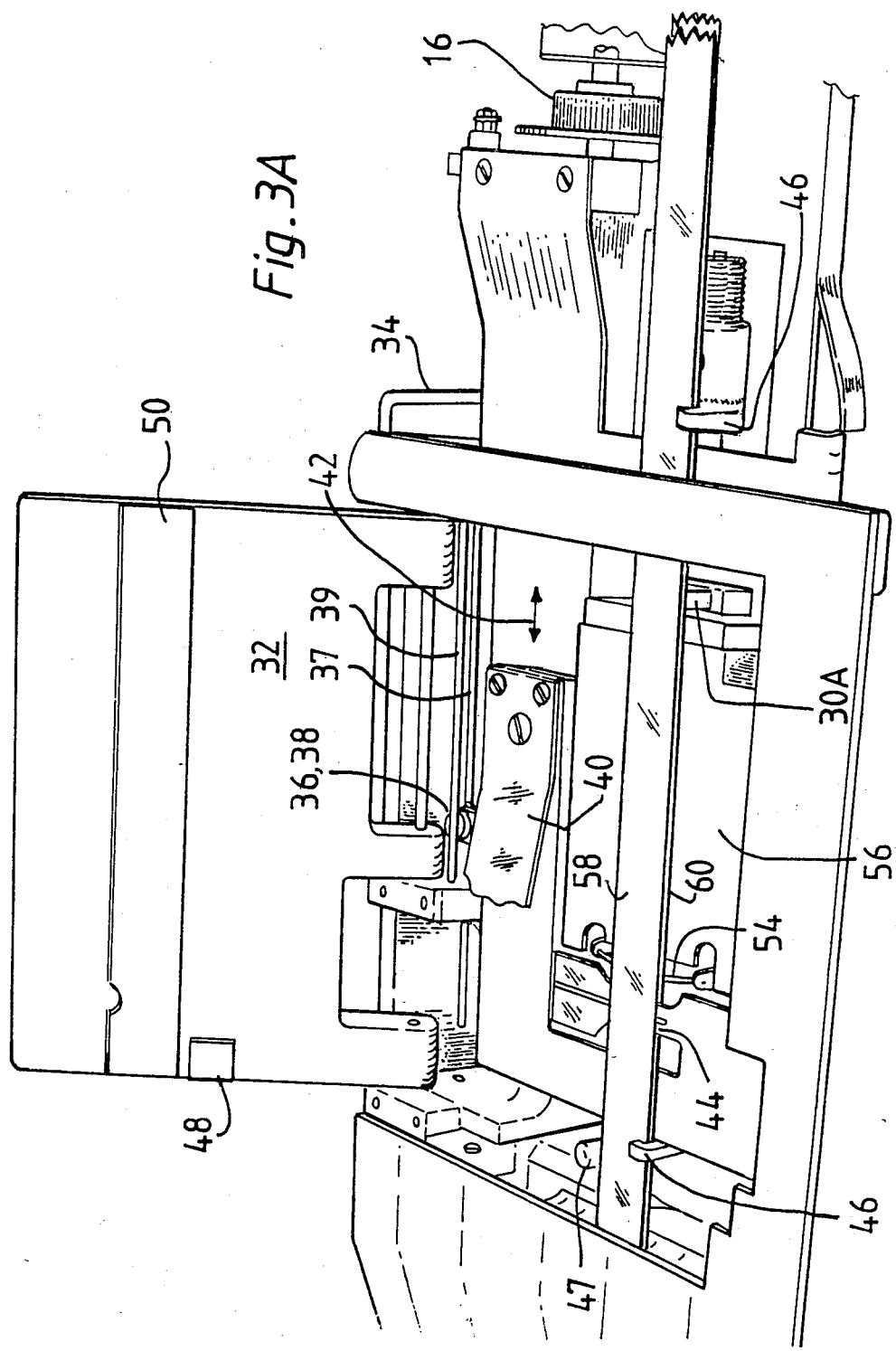

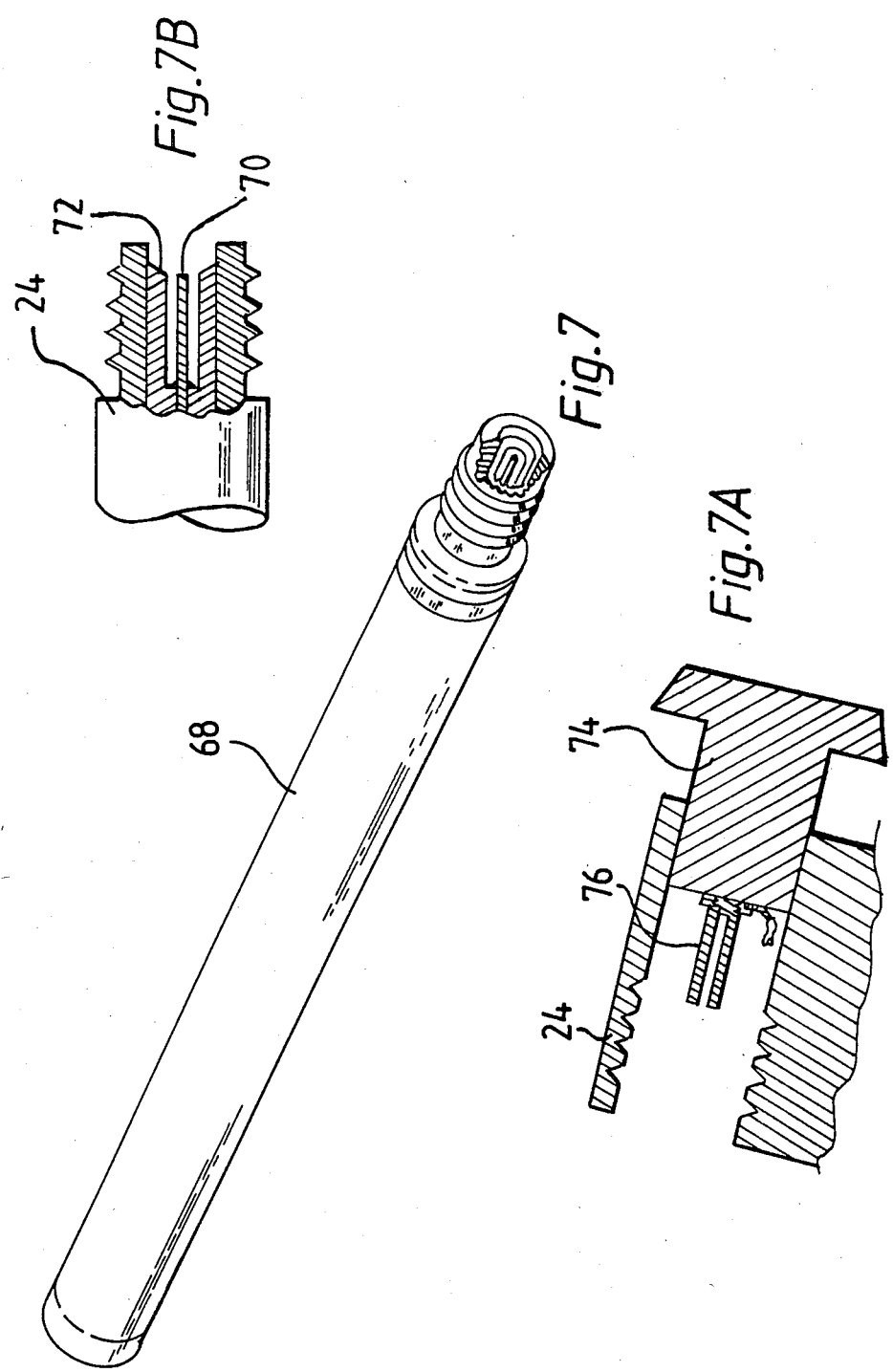

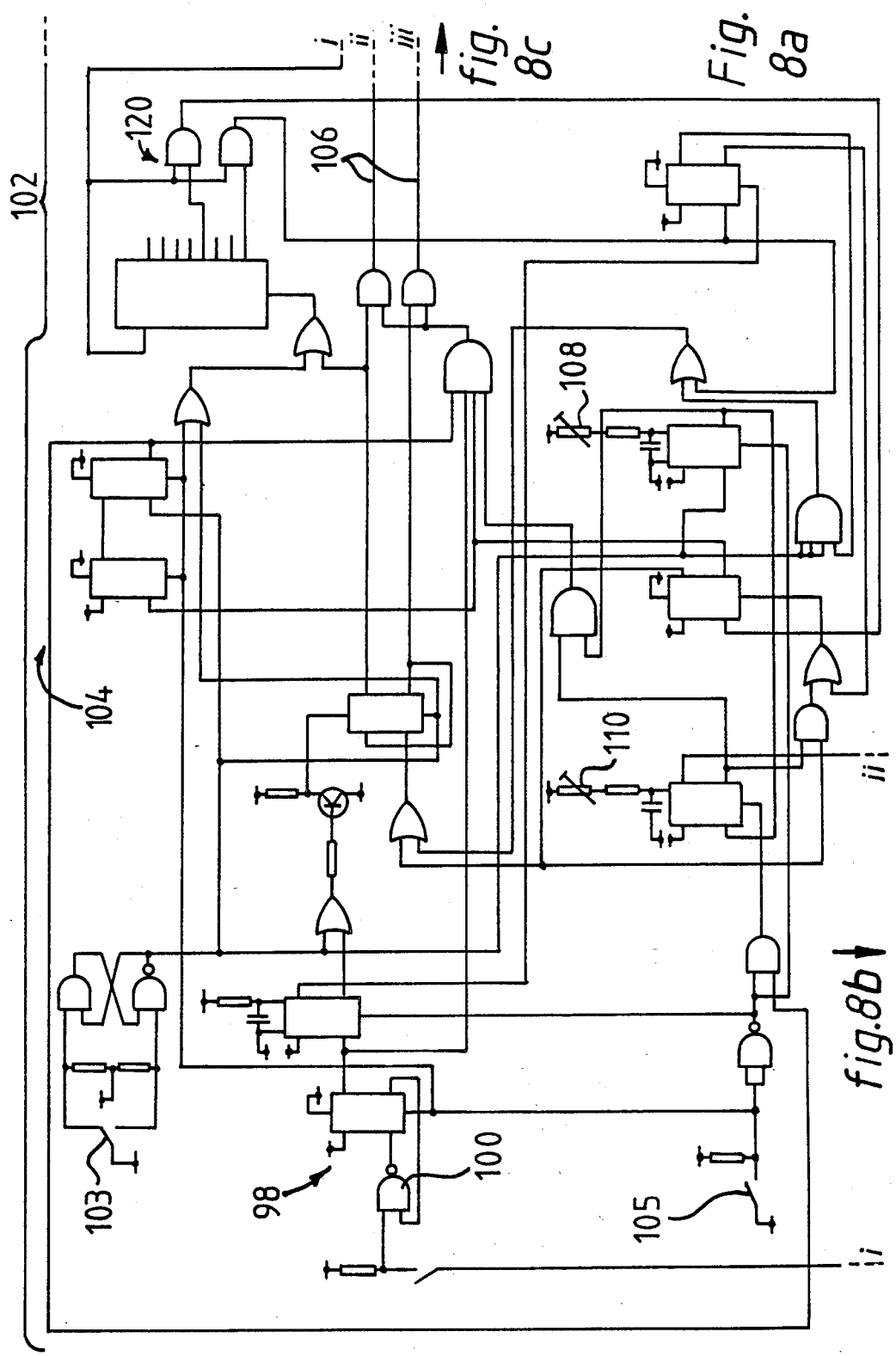

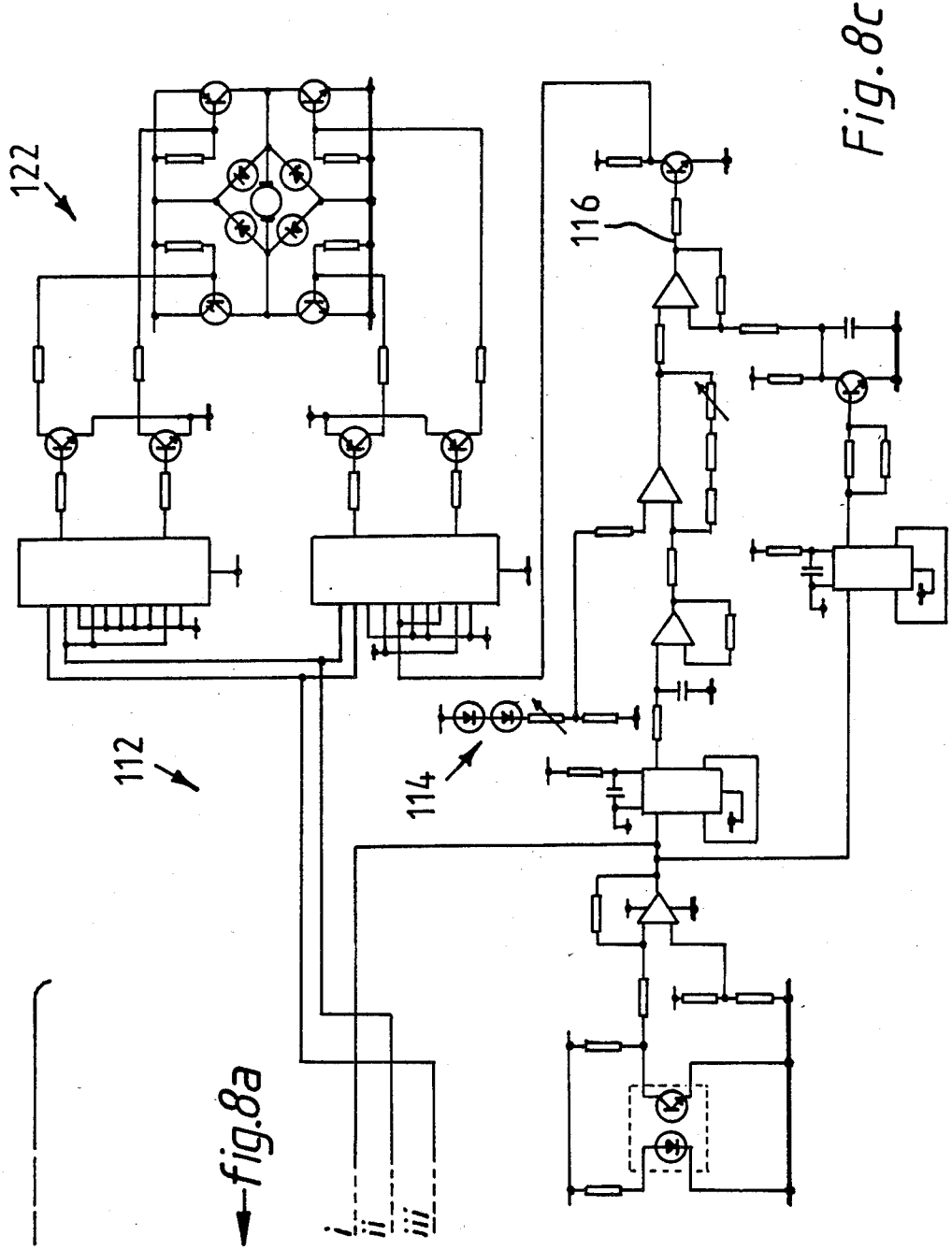

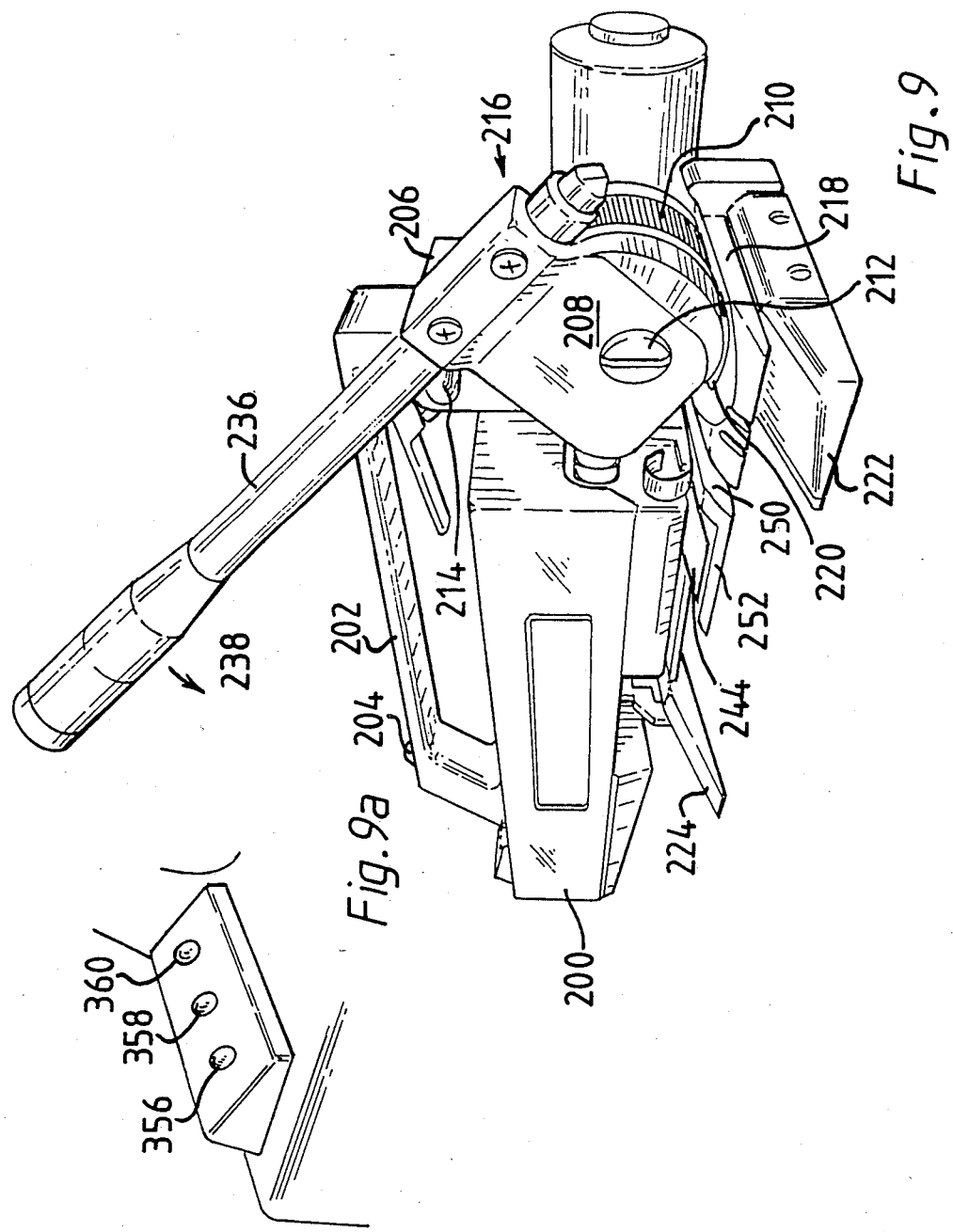

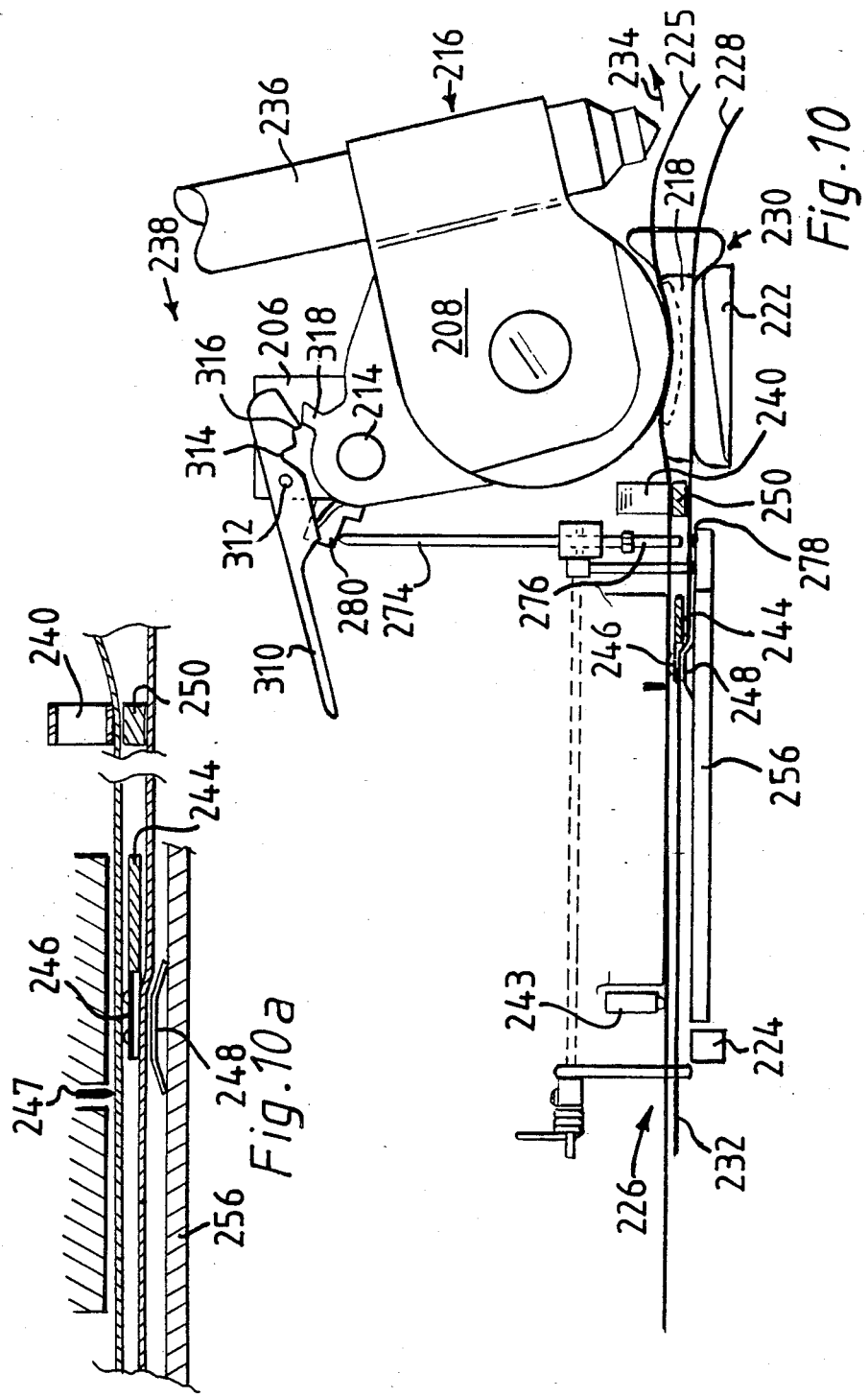

APPARATUS FOR HEAT-SEALING THERMOPLASTICS STRAPS

DESCRIPTION

1. Field of invention

This invention relates to apparatus for heat sealing together layers of strap of thermoplastics material such as polyester and polypropylene.

2. Background to the invention

In the packaging industry, it is a common requirement to tension and secure a thermoplastics strap around a package. In order to secure the tensioned loop, two layers of strap must be fixed together where they overlap at the common beginning and end of the loop.

Mechanical fastenings such as metal clips crimped around the two strap layers or deformable wire buckles locking to the two strap layers produce a structurally inefficient joint and are expensive to produce and handle.

Friction welding, wherein a flat or cylindrical pad is oscillated parallel to the plane of contact of the two strap layers in pressure contact therewith can also result in a structurally inefficient joint for some types of strap, especially a strap of polyester and, in addition, an uncomfortable amount of noise is generated. Furthermore, the high power required necessitates use of a compressed air or mains electric drive.

Ultrasonic welding is equally disadvantageous, being less successful for some types of strap than others, and requiring relatively complex circuitry for providing the necessary operating power.

A known heat sealing process also demands use of a high power source external to the sealing equipment. In this process, a continuously or intermittently heated, relatively massive, heating element is caused to enter between the two layers of strap by moving said element across the strap from one longitudinal edge to the other. The two strap layers are first pressed against the heating element and then, after a short delay, the element is rapidly retracted and the two strap layers are pressed together at the heated regions thereof. This process, in addition to disadvantageously requiring an external power source, produces considerable unpleasant fumes, since the operating temperature rises to a value necessarily higher than the decomposition temperature of the strap material.

It is an object of this invention to provide an improved method and apparatus for heat sealing together two layers of thermoplastics strap. It is another object of this invention to provide improved apparatus for heat sealing together two layers of thermoplastics strap, in particular being apparatus which can be made fully portable, i.e. having an internal power source, and which is capable of operation substantially without generation of noise and fumes, whilst at the same time producing a structurally efficient joint.

THE INVENTION

According to one aspect of the present invention, apparatus for heat sealing thermoplastics strap material comprising a portable tool adapted to receive two sections of strap material which are to be welded together and having a heating element, means for moving the heating element between the straps and a battery source for supplying heating current to the heating element, is characterised by and a control circuit means for detecting the battery voltage on load and drive circuit means for controlling the movement of the heating element between the straps, the control circuit means influencing the drive circuit means to control the speed of the heating element in dependence on the detected voltage level.

In one embodiment the battery is mounted in or on the tool housing.

In another embodiment the battery may be remote from the tool and connected thereto by a cable.

In order to effect a strong and reliable seal which effects melting of the thermoplastics material without causing any decomposition thereof, the amount of heat to be imparted to the straps must be critically controlled. A battery source can supply the necessary heating current, say of the order of 20 amps. or more, but the exact magnitude of this heating current will vary with battery level, although in principle still being a high enough current for the required purpose. The required heating current is too high to be economically controlled at a constant level per se, and effectively has to be drawn directly from the source. The invention compensates for changing battery voltage, i.e. change in the magnitude of the heating effect, by varying the time during which the straps are heated by the heating element. In practice, this entails varying the speed of movement of the heating element between the straps.

The control circuit means conveniently provides inter alia a regulated low power supply for the drive circuit which controls the movement of the heating element, so that the drive circuit means is not affected by changes in the battery level.

The control circuit means preferably also includes a detector of a minimum battery level for satisfactory operation, and a warning indicator associated therewith. This detector will desirably have an adjustable threshold, since some forms of thermoplastics strap have a minimum heating requirement different to that of others.

Preferably the heating element is mounted on a carriage assembly for reciprocal motion between the two straps and an electric motor serves to drive the carriage assembly. Conveniently, the speed of the motor (and thus the speed of movement of the carriage) is detected by a shaft encoder comprising an optical interrupter on the motor shaft from which electrical pulses are obtained the frequency of which is proportional to the motor speed.

In accordance with the invention the detected motor speed is compared with the battery level and the speed adjusted through the drive control circuit.

This adjustment preferably takes place on a continuous basis.

The drive control circuit may include a maximum motor speed control which can be set to suit requirements, e.g. as to the kind of thermoplastics strap, so as to maintain an actual speed jointly related to this basic maximum speed setting and to the battery level.

In order to cause the heating element to be driven reciprocally in the longitudinal direction of the strap, a motor switching and reversing circuit is provided.

A further aspect of the invention concerns the advantageous manner in which the heating current is switched in relation to the reciprocating motion of the carriage driven by the motor. Thus when the apparatus is switched on, with the strap layers to be welded in position, the motor starts a forward movement of the carriage which simultaneously operates a travel switch to begin a count of the pulses derived from the shaft encoder. During this forward stroke the heating current must be switched on and in one embodiment of the invention this is achieved by a mechanically operated switch actuated by the carriage.

In another preferred embodiment the mechanical switch is replaced by a semiconductor switch and the latter is triggered by electrical signals generated when the count value reaches various predetermined numerical values.

Preferably these predetermined numerical values are set up and stored within the tool by a user operable contol.

The strap layers are welded together during this return movement towards the end of which the heating current is switched off, whilst the reverse stroke continues until the carriage reaches its start position when the travel switch is once again operated. Where a mechanical switch is employed to control the heating current, this switch may include a lost-motion connection whereby, although the current is switched on late in the forward stroke, it is not switched off at the corresponding position in the reverse stroke but at a point beyond the position of the carriage at which switch on occurred, closer to the start position.

In the preferred embodiment in which the current controlling switch is a semiconductor device the firing circuit preferably triggers this device at the required points in the cycle.

It will be appreciated that the opto-interrupter count referred to is a fixed number of pulses. Although the frequency of these pulses will vary with the different motor speeds adjusted to match battery level, the length of the forward and reverse strokes is unaffected; it is only the time taken to carry out the reciprocating motion which will vary with the battery level.

After the first reciprocal movement of the carriage a second shorter reciprocating movement is effected, using a smaller opto-interrupter target count, to bring the heating element under a cutter, which acts to sever the welded loop of strap from that leading to the supply reel, using the heating element as a reaction member. Preferably, either at the end of the forward stroke of the second reciprocation, in which the heater element is positioned under the cutter, or before the second reciprocation begins, a pause period set by a potentiometer allows the welded joint fully to solidify before the cutter is energised. The cutter is preferably a blade which is heated by passing an electric current therethrough from the battery. Preferably the current is controlled by a current limiting device connected in series with the element and the current is thereby controlled so as always to be constant within the range of operating battery voltages.

In an embodiment of the invention incorporating mechanical switches, there are two separate switch circuits, one for the low power control circuitry and one for the heating element and motor switching circuitry. These switch circuits incorporate three switches. One switch is a mechanical switch which connects up the batteries. The second is a safety switch, conveniently actuated by movement of a handle operator with a squeezing action. The third is a strap detection circuit, operated when a strap is inserted; this last mentioned switch actuates the low power control circuitry, without which the apparatus is rendered inoperable. In operation therefore, the sequence of powering-up in this embodiment comprises the following steps: operate the mechanical switch to connect up the batteries (this switch is preferably an engageable and disengageable connector plug); squeeze the handle operator to open the safety switch; load the strap into the tool thereby energising the control circuitry; and release the handle to close the safety switch. The apparatus is now fully powered and ready for operation by depression of a start button. At the end of a welding operation using this embodiment the user squeezes the handle to open the safety switch, removes the tool from the welded joint, releases the handle, and, if necessary, disengages the plug switch.

The plug switch can serve as a convenient means by which the batteries can be charged, as by overnight connection to the mains supply.

Furthermore, if desired, the handle operator may constitute a housing in which the batteries are accommodated. Alternatively or additionally the batteries may be located in a removable housing member attachable to the side of the apparatus.

DESCRIPTION OF DRAWINGS

A preferred arrangement of heat sealing tool in accordance with the invention will now be described by way of example with reference to the accompanying drawings, in which:

FIG. 2A is a similar view to that of FIG. 2 with part of the housing out displayed to show the electrical heater contact asssembly;

FIG. 2B is a scrap section of the contact assembly;

FIG. 3 is a view similar to that of FIG. 2, with the pressure plate open;

FIG. 3A is a similar view to that of FIG. 3 with the tape layers in position;

FIG. 7 illustrates detail of the battery pack housing;

FIG. 9 is a perspective view of another embodiment of the present invention showing an alternative strap welding tool complete;

FIG. 9a is a scrap view of the rear end of the casing of the tool shown in FIG. 9;

FIG. 10 is a side elevation of the tool shown in FIG. 9 with the casing removed and other parts not shown or only partly shown for clarity;

FIG. 10a is a side elevation to an enlarged scale of part of the view of FIG. 10;

DESCRIPTION OF EMBODIMENT SHOWN IN FIGS. 1 TO 8

Figure 1:
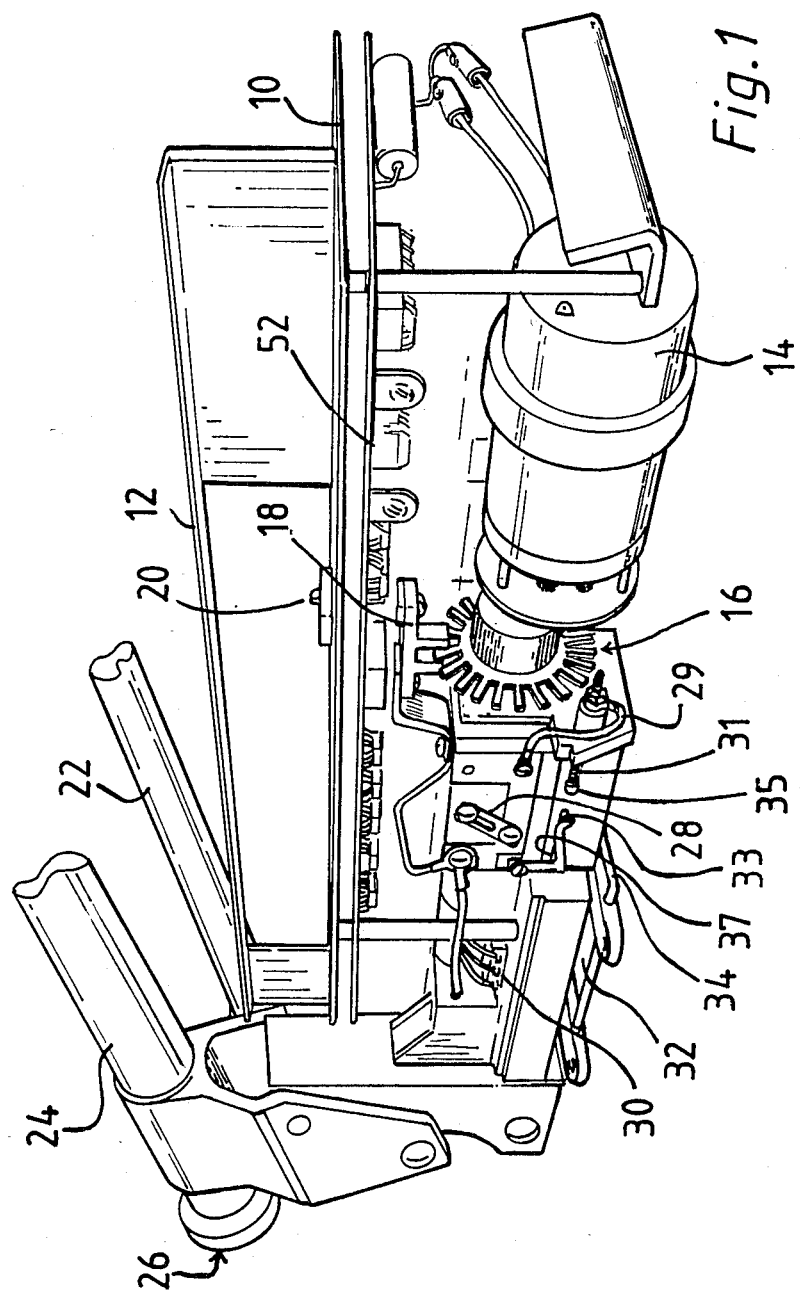
FIG. 1 is a perspective view of one embodiment of the present invention showing a strap welding tol with its casing removed.

Referring first to FIG. 1, the tool comprises a supporting frame 10 with a carrying handle 12.

The frame 10 supports the working parts of the tool. Such parts include a motor 14, with an opto-interrupter wheel 16 carried by its output shaft. An opto-coupler for the wheel is indicated at 18. The reference 20 denotes a 'start' switch.

Two operating handles are provided. The handle 22 constitutes a handle for tensioning a thermoplastics strap which is to be welded in tensioned condition. The other handle 24 is hollow and houses a rechargeable battery pack providing power for the tool. This handle terminates with a plug-type switch 26.

Other parts indicated in FIG. 1 include a heater current selector link 28 for pre-setting the heating current to a heating element, a microswitch 30 operated by the movement of a heating element assembly (not visible in FIG. 1) into and away from its home (or start) position within the tool, a pressure plate 32 by which pressure is applied to the strap during welding, together with a pressure plate retaining clip 34, and heater contacts 33, 35, the first being mounted at the end of 37 and the latter being mounted at an opposed end of the slidable contact rod 31.

Figure 2:
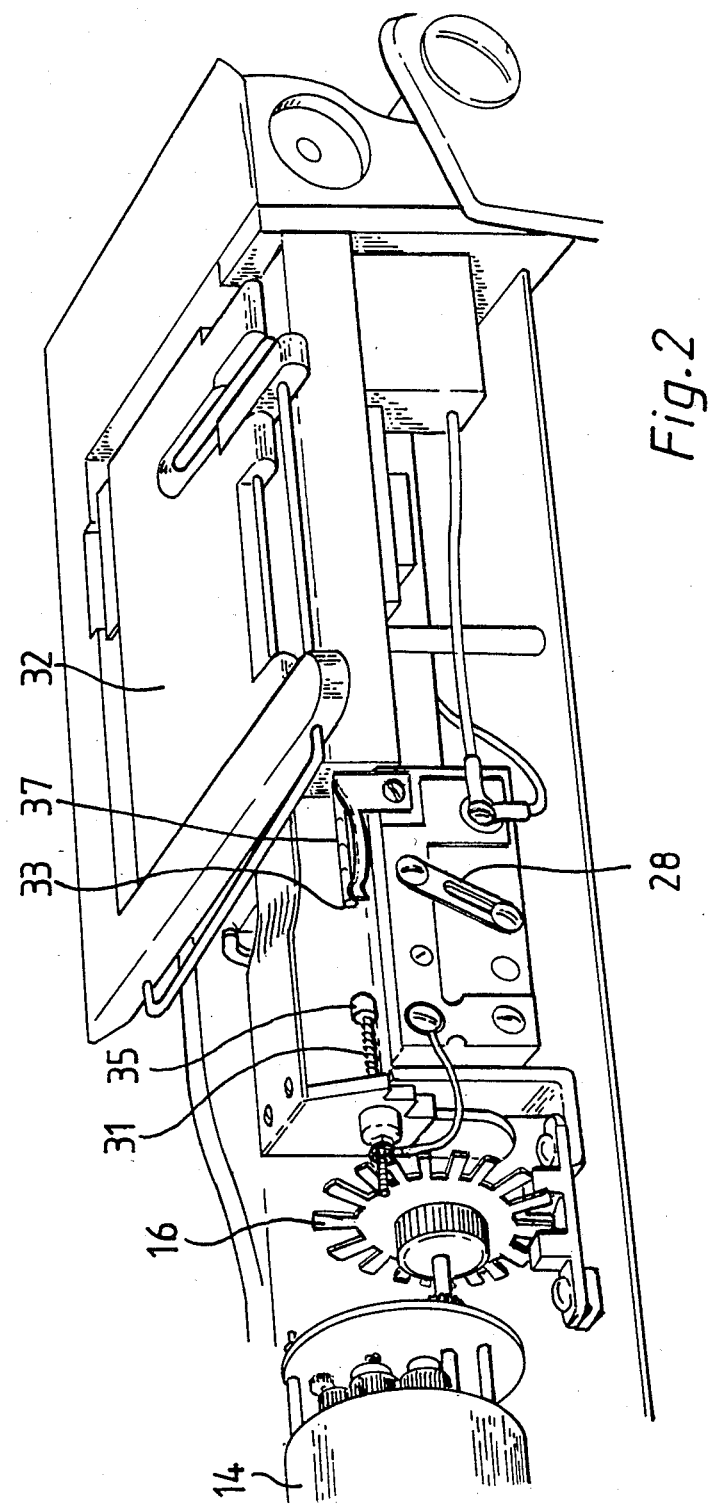
FIG. 2 is a perspective underside view of one end portion of the tool, with a pressure plate closed.

FIGS. 2 and 3 are underside views at one end of the tool, one with the pressure plate 32 closed and one with said plate open to reveal the working parts above it. FIG. 3 looks at the underside laterally from the opposite side to FIG. 2.

In FIG. 3, a spring 40 is cut away to show a thin flat L-shaped heater 42 with heating element 44, the spring and heater being mounted on a carriage which is driven with a reciprocating motion, as denoted by the arrow in FIG. 3, longitudinally of the strap to be welded, by the motor 14. A cutter assembly 43 is mounted to the rear of the heating element 44. Opposite ends of a tape retainer are visible at 46; this tape retainer is coupled to a pressure plate 'push-off' release rod 47, the pressure plate 32 having a pad 48 for cooperation therewith. The pressure plate 32 also carries a nylon runner 50. The contact rod 37 is indicated, together with the heater contacts 36, 38, which engage rod 37 and a second rod 39 (to be described) whereby the heater current is switched on in timed relationship to the motion of the heating element carriage. Reference 54 denotes a cutter for cutting the welded strap. A fixed platform is shown at 56.

FIG. 3A is a similar view to that of FIG. 3 showing tapes 58 and 60 held in place by clips at each end of the tape retainer 46.

Figure 4:
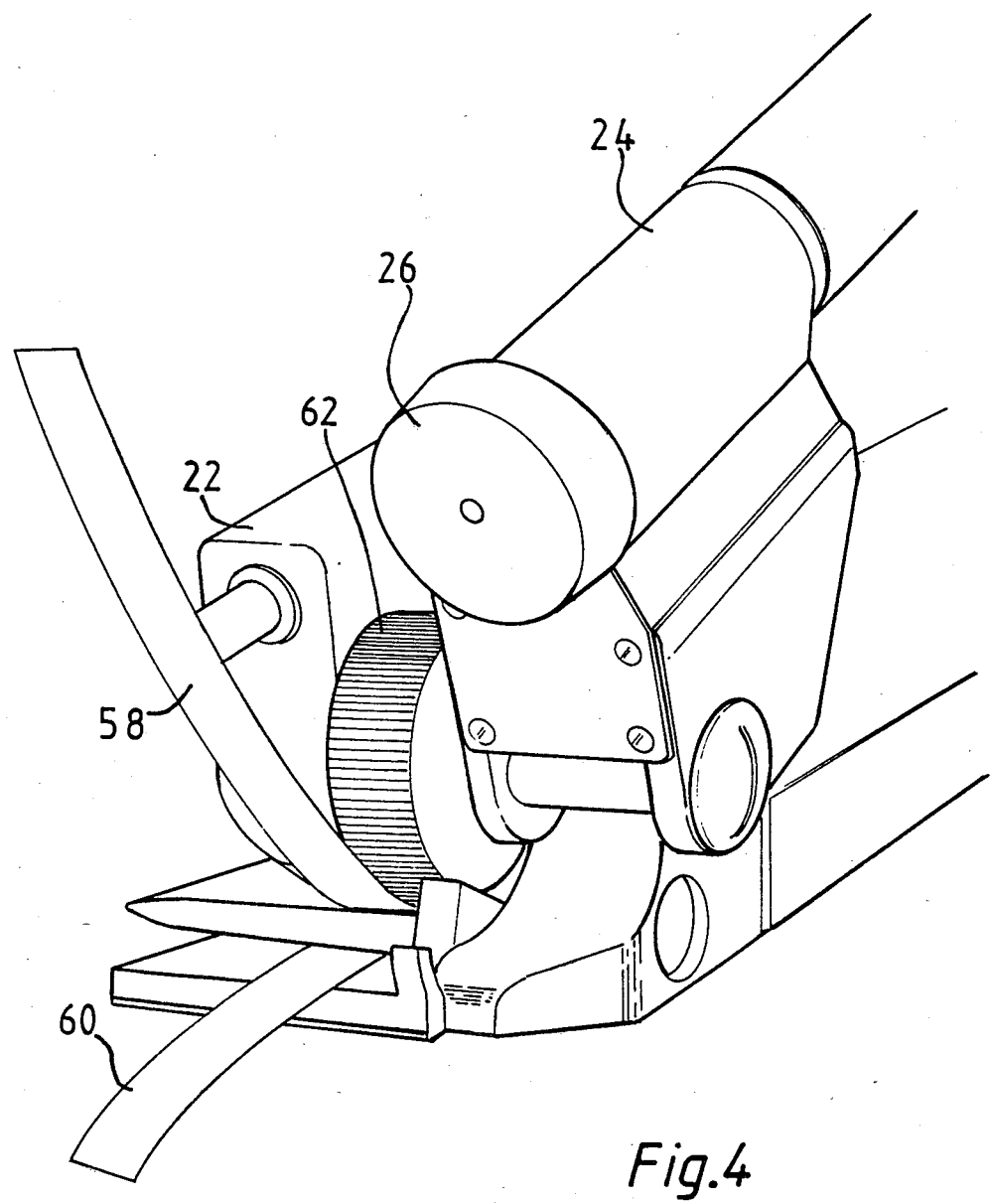
FIG. 4 is a perspective view of one end of the tool, with a strap entered therein.
Figure 5:
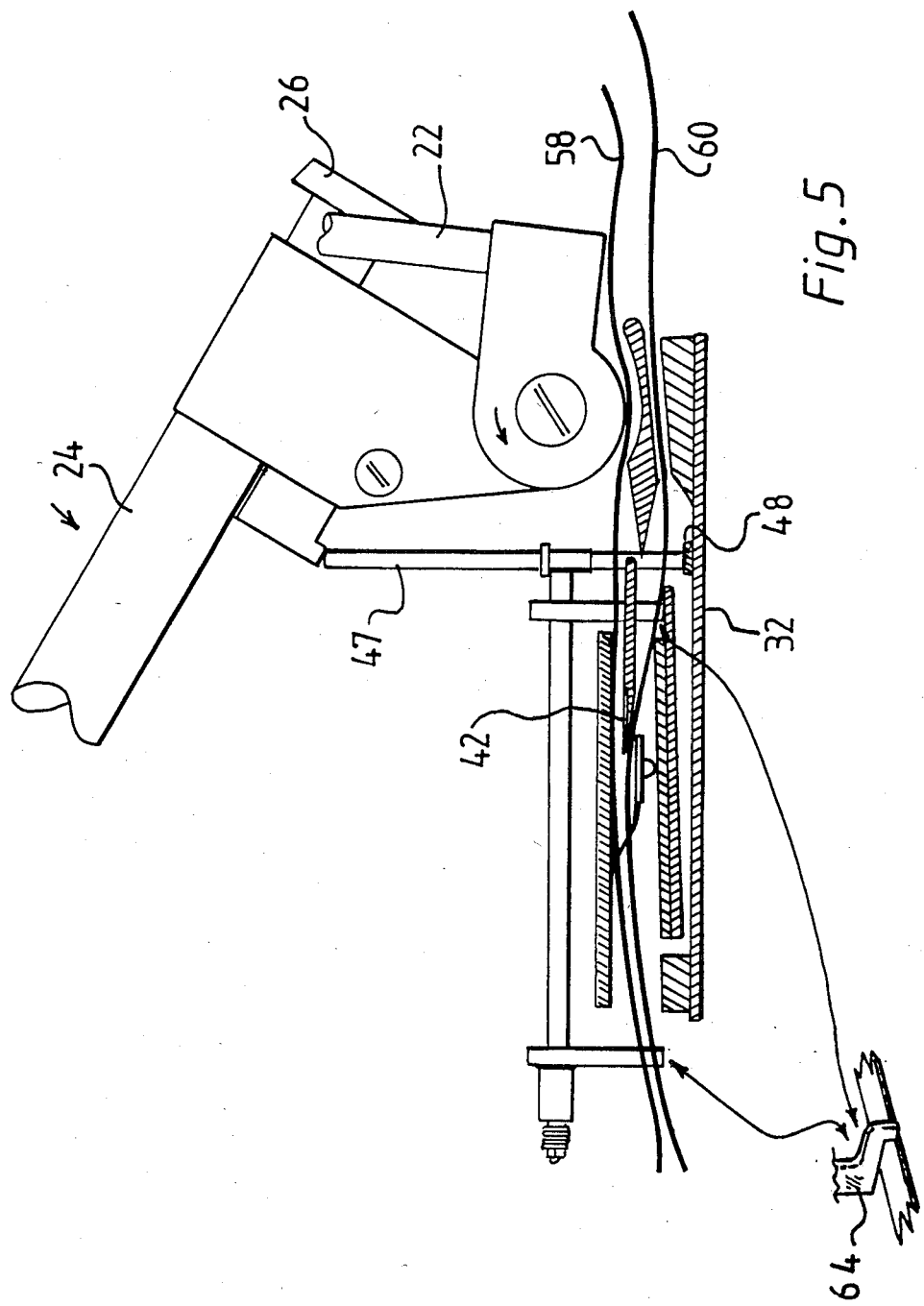
FIG. 5 shows the path of the strap through the tool.

FIG. 4 shows two strap layers 58, 60 entered into the tool to be tensioned by a knurled tensioning wheel 62 carried by the tensioning handle 22. The path of the strap layers is shown in FIG. 5. The strap 58, 60 passes from under the tensioning wheel, which also serves to thread the strap into the tool, one layer above and one layer below the heater assembly 42 and both above the pressure plate 32, guided at either end of the pressure plate by a clip 64 (FIG. 5 detail) at each end of the tape retainer 46.

Figure 6:
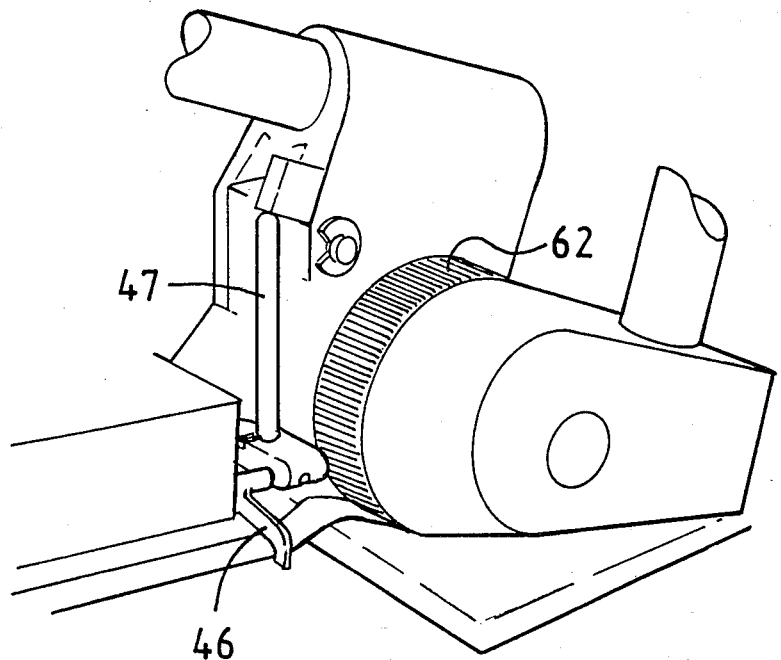
FIGS. 6 and 6A show details of the pressure plate and tape retaining means, respectively in perspective view and in end view.
Figure 6A:
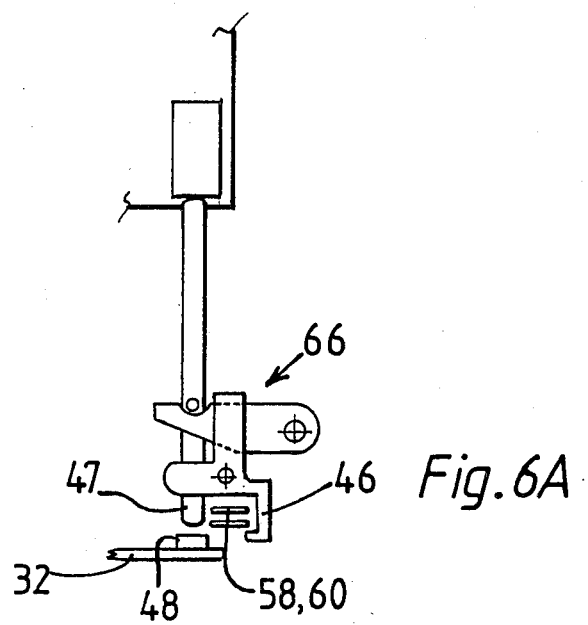

FIGS. 6 and 6A again show the pressure plate and tape retainer assembly. By virtue of the pressure plate 'push-off' rod 47 and its coupling 66 to the tape retainer 46, the spring loaded pressure plate 32 and said retainer 46 are released when the battery pack handle 24 is pushed fully down. The tensioning wheel 62 is driven through a one-way ratchet from the other handle assembly 22.

FIG. 7 shows details of the battery pack housing 24, in disassembled view. Reference 68 denotes a sealed battery pack, and the end of the housing 24 is shown in cross-section to render visible a contact pin 70 surrounded by insulator 72. The plug 74 is of nylon, and has a pillar-type pin contactor 76. The batteries can be recharged, overnight for example, via the contact pin 70.

Attention is drawn, in particular, to the heater contacts 36, 38 and the contact rod 37 associated therewith. When the heater assembly 43 is reciprocated, the heater current is to be switched 'on' towards the end of the forward stroke and switched 'off' at a non-corresponding later point in the return stroke. This is accomplished by means of a lost-motion connection associated with the contact rod 37 and best seen in FIGS. 2A and 2B.

Turning to FIGS. 2A and 2B the heater contacts 36, 38 which move with the heater assembly are shown making sliding contact with the two conductive rods 37 and 39. Rod 37 is insulated from its supporting structure (generally designated 41) as is the contact 38 which makes sliding contact therewith.

Electric current can flow from the battery via selector link 28, lead 29 and rod 31 to rod 37 (when contacts 33 and 35 are made) and via the sliding contact 38 to the 'insulated' side of the heater 44. The 'earthing' end of the heater is electrically connected to the conductive housing of the coil via contact 36 and rod 39 which is electrically connected to the support structure 41.

Pins 45 and 47 protrude radially from the rod 37 as best seen in FIGS. 2A and 2B, and are engaged by the contact 38 as the carriage moves relative to the support structure 41.

During forward movement of the rod 37 the contact 38 engages pin 45 and pushes the rod 37 towards rod 31 to engage the contacts 33 and 35. Final movement of the rod 37 (after engagement of 33 and 35) is accommodated by a spring 49 which is compressed as rod 31 moves ahead of 37.

During return movement of 37, engagement of 33 and 35 is maintained by the action of spring 49 until the adjustable locknut 51 abuts the collar 53, after which contacts 33 and 35 disengage.

It is to be noted that during the reverse movement of the carriage 43, the pin 45 pushes against the contact 38 under the action of the spring 49 until the nut 51 abuts the collar 51 at which time there will be no tendency for the rod 37 to move out of engagement with the contact 35 at the end of rod 31 until the contact 35 has moved into contact with pin 47, whereupon the rod 37 will again continue to move rearwards and disengage the contacts 33 and 35.

The separation of the pins 45 and 47 thus introduces the last motion previously referred to.

A leaf spring 55 (see FIG. 2A) engages the rod 37 with sufficient force to create a friction brake so preventing the rod 37 from sliding except under positive drive from the engagement of the contact 38 with one of the pins 45 or 47.

Figures 8A, 8B:
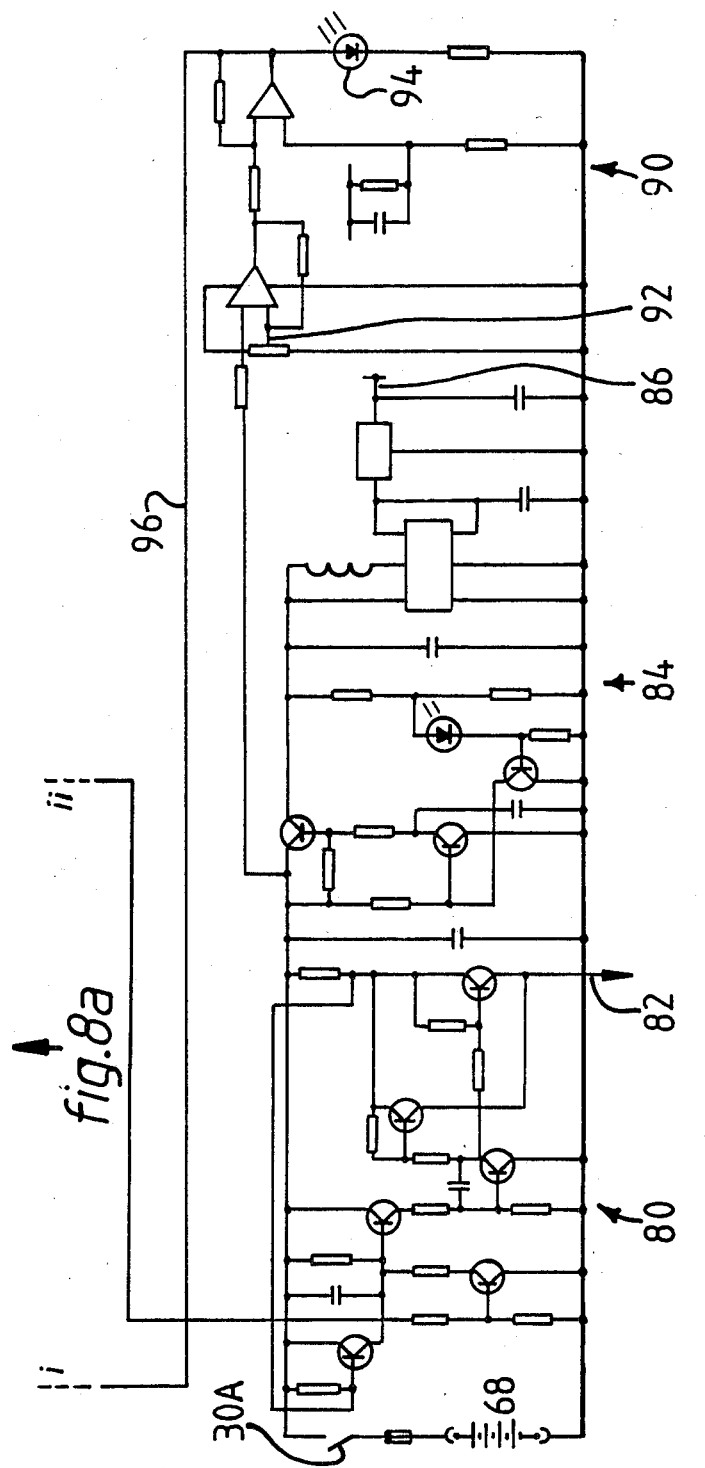
FIG. 8 is a circuit diagram of the controlling electronics.

FIG. 8 is a circuit diagram of the controlling electronics, primarily carried by a printed circuit board indicated at 52 in FIG. 1.

In this circuit diagram, the battery 68 is shown at the bottom on the left-hand side, in series with the strap-detect switch 30. Reference 80 indicates an output circuit providing at 82 a high amperage output for operation of the heater and the cutter. Reference 84 is a regulating circuit which provides a low amperage constant voltage at 86 for powering the p.c.b. This circuit includes a power-on indicator 88. The circuit 90 is a battery level detector, with a low voltage set point adjuster at 92 and a warning indicator at 94. This circuit provides an output at 96, sent via the start microswitch 20 to a sub-circuit 98. Gate 100 must be grounded to enable powering of the following control circuitry generally indicated at 102, and will not be grounded if the battery level is below the set point threshold.

The control circuitry 102 includes a sub-circuit 104 primarily for control of the timings and magnitudes of the heater and cutter current, but includes outputs at 106 for starting and stopping the motor. Reference 103 denotes the travel switch 30 of FIG. 1 by which the sealing cycle is initiated and terminated, whilst a safety switch is shown at 105. Component 108 is employed to set the length of the cutter pause before a welded strap is severed from the supply reel. Component 110 is used to set the basic magnitude of the heater current. The exact level of the heater current, as supplied by circuit 80, will vary with the battery level.

Circuitry 102 also includes a sub-circuit 112 for controlling the speed of the motor, in dependence on the battery level. Circuit 114 checks the battery level against the motor speed as measured by the opto-interrupter 16 and provides an output at 116 for regulating the motor speed accordingly, so that the motor speed is regulated to compensate for changing battery level in a manner which ensures that the strap is always heated to the critical extent necessary to achieve melting without decomposition.

A feedback 118 from the opto-interrupter enables a pulse count at 120 which fixes the point of reversal of the motor at the end of its forward stroke for heating and its subsequent shorter forward stroke for cutting.

The motor switching and reversing circuitry at 122 is powered from the battery rather than the low amperage regulated output.

The sequence of use, therefore, is that the user first engages the plug-in switch 26, but this does not energise the p.c.b. The operating handles are then squeezed together, opening the safety switch 105. The strap (two layers) is then loaded into the tool, whereon the strap detector switch 30A is closed, powering the p.c.b. The squeeze-grip is now released, closing the safety switch to set up the circuit.

The strap is now tensioned, and the start button 20 is pressed to start the welding cycle, as follows:

(a) the motor starts its forward drive;
(b) almost immediately the travel switch 103 is changed over to start an opto-interrupter count;
(c) towards the end of the forward drive (forward stroke of the heater assembly), the heater current is switched on via contacts 33, 35 operated by the carriage movement, and independently of the p.c.b.;
(d) at the end of the count, the motor reverses;
(e) at a predetermined point in the return drive the heater current is switched off when contact 38 engages pin 49 and contacts 33, 35 disengage, and the heater cools;
(f) the end of the reverse drive is determined by reversal of the travel switch;
(g) the motor returns to forward drive, again changing 20 the travel switch;
(h) a shorter opto-count is thereby initiated;
(i) at the end of the count the carriage stops with the leading part of the heater member under the cutter;
(j) after a set pause the cutter is temporarily energised to part the strap from the reel, using the heater member as an abutment;
(k) the cutter switches off and the motor begins a reverse drive;
(l) the travel switch is changed and the motor is switched off, completing the heat sealing cycle.

The operator now squeezes the battery pack handle to open the safety switch and withdraws the tool from the strap (which has been welded to secure it in tensioned condition looped around a package), whereby the strap detent switch opens to de-energise the p.c.b. If appropriate, the plugtype switch is disengaged.

DESCRIPTION OF PREFERRED EMBODIMENT SHOWN IN FIGS. 9 TO 20

FIGS. 9 to 21 show an alternative and preferred embodiment of the invention in the form of another tool also adapted for welding plastics strap material in which inter alia the mechanically operated switches for controlling the supply of current to the heater and cutter are replaced by semiconductor devices, typically FET devices, and which includes further refinement facilities the insertion of strap into the tool and the control of the length and quality of the weld.

The tool is shown in a general perspective view in FIG. 9 as comprising an outer casing 200 with an integral handle 202 which extends fore to aft of the housing 200 and includes at its rear end a push start button 204.

The casing 200 encloses the working parts of the tool which are supported on a rigid backbone formed by a metal casting (not visible in FIG. 9) which at the front of casing 200 extends forwardly and upwardly to form a rigid support which can just be seen at 206. The support provides a mounting for a subassembly formed by a casing 208 and serrated wheel 210 which are rotatable about a central axis (not visible in FIG. 9) and are held in place by means of a bolt 212.

Figure 14:
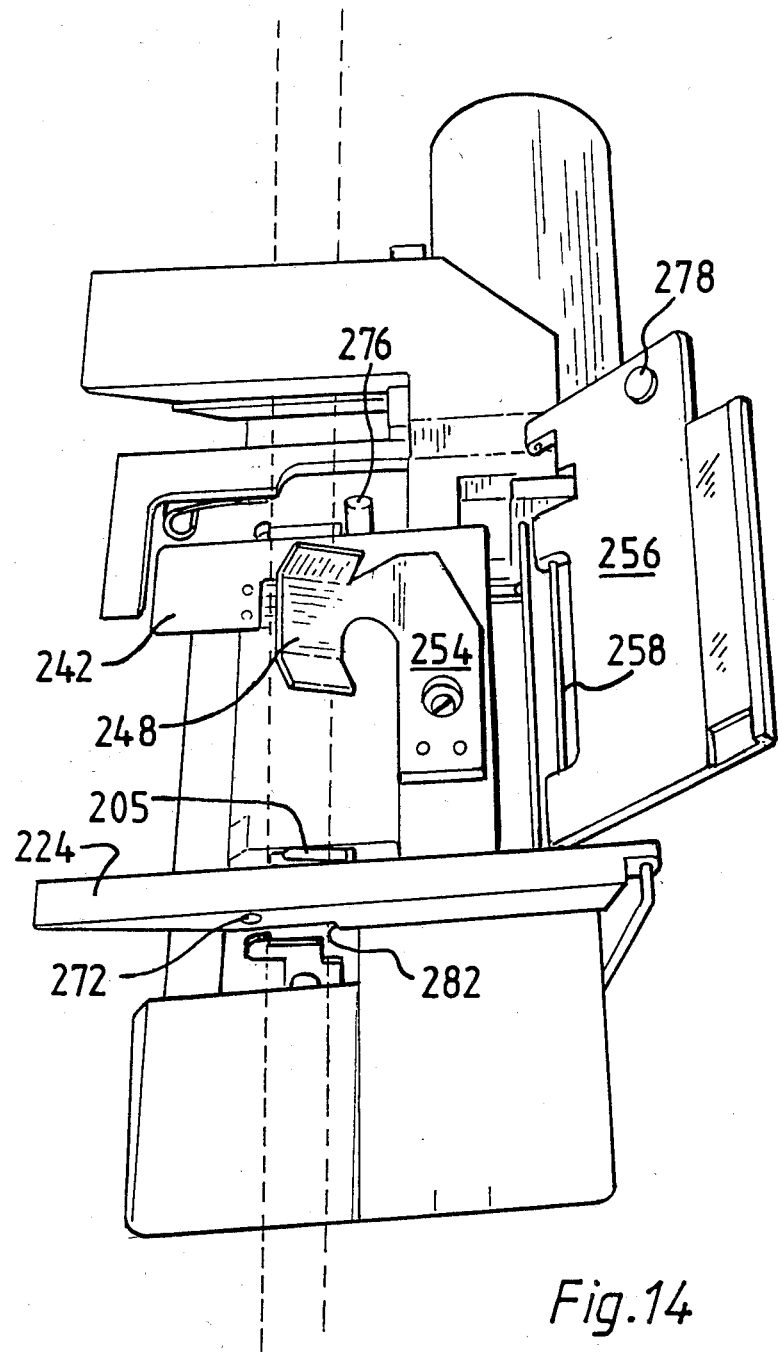
FIG. 14 is a perspective underside view of the tool with the hinged plate shown in an open condition.
Figure 15:
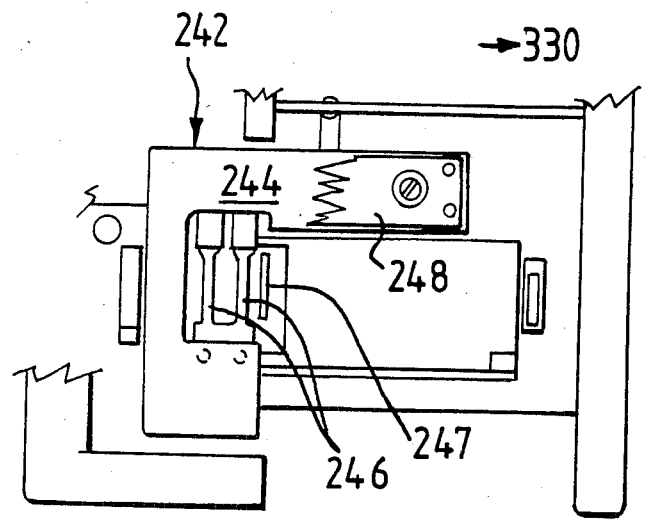
FIG. 15 is a scrap underside plan view showing details of the heating element.

The housing 208 is itself pivotally joined to the support 206 by a shaft 214 which extends proud of the housing 208 as is best seen in FIG. 14.

The subassembly generally designated 216 is mounted above and cooperates with a shaped shoe 218 the upper surface of which is dished to accommodate the curved underside of the casing and serrated wheel 210 and the upper dished surface includes an insert 220 of a plastics material such as Nylon at least in alignment with the wheel 210.

The tool includes two feet 222 at the front and 224 mid way between the front and the back of the tool.

A length of plastics tape which is to be wrapped around a package or bundle and after tightening, welded to itself to form an endless loop, can pass from front to back through the tool and the way in which the tape is received and can pass therethrough is best seen in FIG. 10. Here the length of tape coming from the reel or other supply thereof is designated by reference numeral 224. This tape passes below the subassembly 216 and above the shoe 218 and extends rearwards through the welding station to emerge at the rear of the tool at 226. The length of tape must then be imagined as extending rearwardly and downwardly and around a package or bundle of items to return in an upward direction to re-enter the front end of the tool. The return end of the tape coming up to the front of the tool is shown at 228. This return end enters the tool at 230 between the foot 222 and the shoe 218 and passes therebetween to extend in a similar manner as before through the welding station to emerge at the rear of the tool as a short tail 232.

It will be noted that the tail 232 is below the other length of tape and if the tail end 232 is anchored, it will be seen that the loop of tape extending between points 226 and 228 can be tightened by drawing the tape 224 in the direction of the arrow 234.

This is achieved by rotating the serrated wheel 210 whilst in contact with the tape. Rotation is achieved by pulling down on the handle 236 in the direction of the arrow 238. A ratchet drive mechanism between the casing 208 and the wheel 210 allows rotation to be transmitted to the wheel 210 as the lever 236 is moved in the direction of the arrow 238 but prevents reverse direction drive being transmitted to the wheel as the lever is moved in a reverse direction. The wheel 210 can thus be rotated in a series of steps by a pumping action involving moving the lever 236 forwards and then backwards. Each rotation of the wheel 210 drags more of the loop of tape in the direction from the rear exit 226 to the forward entry position between subassembly 216 and the shoe 218 so tightening the loop around the package or bundle.

As mentioned above, this will only occur if the free end of the tape is anchored and this is most simply achieved by causing the tape to be nipped between the foot 222 and the shoe 218.

It will be noted that by clamping the tape on the one hand between 222 and 218, and on the other hand between 218 and 216, the upper tape length extending through the tool will be tensioned to whatever amount is desired by incrementally rotating the wheel 210, whilst the tail end which extends below the tensioned length of tape, is itself not tensioned in any way. This is of considerable importance since the lower free tail can thus be moved upwardly into contact with the underside of the stretched length of tape with very little force. Thus only a small amount of energy is required to urge the layers of tape into contact to achieve the weld.

The tape path through the tool is better seen by referring to FIGS. 10 to 15 inclusive, as well as FIG. 9. FIGS. 10 and 10a are not true elevations nor true cross-section through the machine, and are in part diagrammatic, but illustrate most clearly the actual path of the tapes. Reference to the later FIGS. 12 to 15 will indicate the actual shape of the various component parts only sections of which are visible in FIG. 10.

Dealing with the upper tape path first, the tape is guided below a spring 240 to extend over a heater assembly (best seen in FIGS. 14 and 15 and generally designated 242) to extend rearwardly under a strap sensing microswitch 243 to exit at 226 as previously described. The heater assembly which can best be seen in FIGS. 13, 14 and 15 and generally designated 242 comprises a cut-away plate 244 across which is stretched a heater element 246.

By virtue of the cut away in the plate 244, so the lower tape 228 can be brought into intimate contact with the underside of the heater 246 under the action of a spring 248. The latter is best seen in FIG. 14 and it will be noted is anchored via rivets to a lateral extension of the plate 244 to the side of the tape path and well clear of the latter. In order to avoid obscuring parts below it, the spring is mostly cut away in FIG. 15 although the section which is riveted to the plate 244 can be seen and is referenced accordingly.

The plate 244 thus serves to separate the two tape sections just in advance of the heating element 246. However, further separation is also acheived by virtue of an arm 250 which extends through the tape path between the upper and lower tapes immediately below the spring 240. The upper tape is thus guided between items 240 and 250 and the latter serves to separate the top tape from the lower tape which extends below item 250.

Although only the cross-section of the arm of the item 250 is visible in FIG. 10, reference to FIG. 9 will show that the outboard end of the arm 250 is a rearwardly extending finger 252 which is chamfered as is also the upper leading surface of the shoe 218 so as to facilitate the insertion of the upper tape thereover.

The finger 252 co-extends with the heater support plate 244 also visible in FIG. 9.

As best seen in FIG. 14, the spring 248 includes a laterally and rearwardly extending arm 254 by which it is connected to the plate 244 as previously mentioned, and the resilience of the arm 254 tends to urge the spring 248 away from the tape path in a downward direction as viewed in FIG. 10. The spring is urged in an upward direction by closing a plate 256 which is hinged by means of a pin 258 along one side of the underside of the tool and can be opened as shown in FIG. 14 or closed into a position as shown in FIG. 10 by hinging the plate about the pin 258 through the intermediate position shown in FIG. 13 at which the plate engages the spring 248.

The plate 256 is maintained in its closed position by means of a second spring generally designated 260 which extends through an aperture in the opposite end of the foot 224 (see FIG. 13) and at its other end through a fixed strut 262 which extends from and is integrally formed with the backbone of the machine. The spring 260 includes an arm 264 which engages in an undercut 266 on the underside of the plate 256 and the other end is also bent around to form a similar arm 268 albeit radiating from the central section of the spring in a radially different direction from the arm 264, so that by depressing arm 268 toward the underside of the tool, so the arm 264 is forced into the undercut 266 to close the plate firmly and hold it in place. The outboard end of the arm 266 is inturned at 270 and the foot 224 includes an aperture at 272 into which the inturned end 270 can be sprung to retain the spring in its tensioned position. Whilst so maintained, the spring holds the plate 258 firmly against the spring 248 and thereby tensions the latter against the underside of the tape 228 forcing the latter into contact with the underside of the heater element 246 as previously described.

Whilst it is possible to remove the end of the spring 270 and thereby release the plate 256 so as to reveal the underside of the interior of the tool as shown in FIG. 14, the plate 256 will not normally be opened in this way since for normal operation, it is sufficient to move the plate by a centimetre or so away from the tape path to release the spring 248 and thereby enable tape to be inserted or removed from the tool. To this end the plate is acted on by a thrust rod 274 (see FIG. 10) which is of adjustable length in that the lower end is threadedly engaged in a cap 276 so that the overall length can be adjusted. The foot of the cap normally rests on a thrust button 278 on the inside surface of the plate 256, which can also be seen in FIG. 14.

Figure 17:
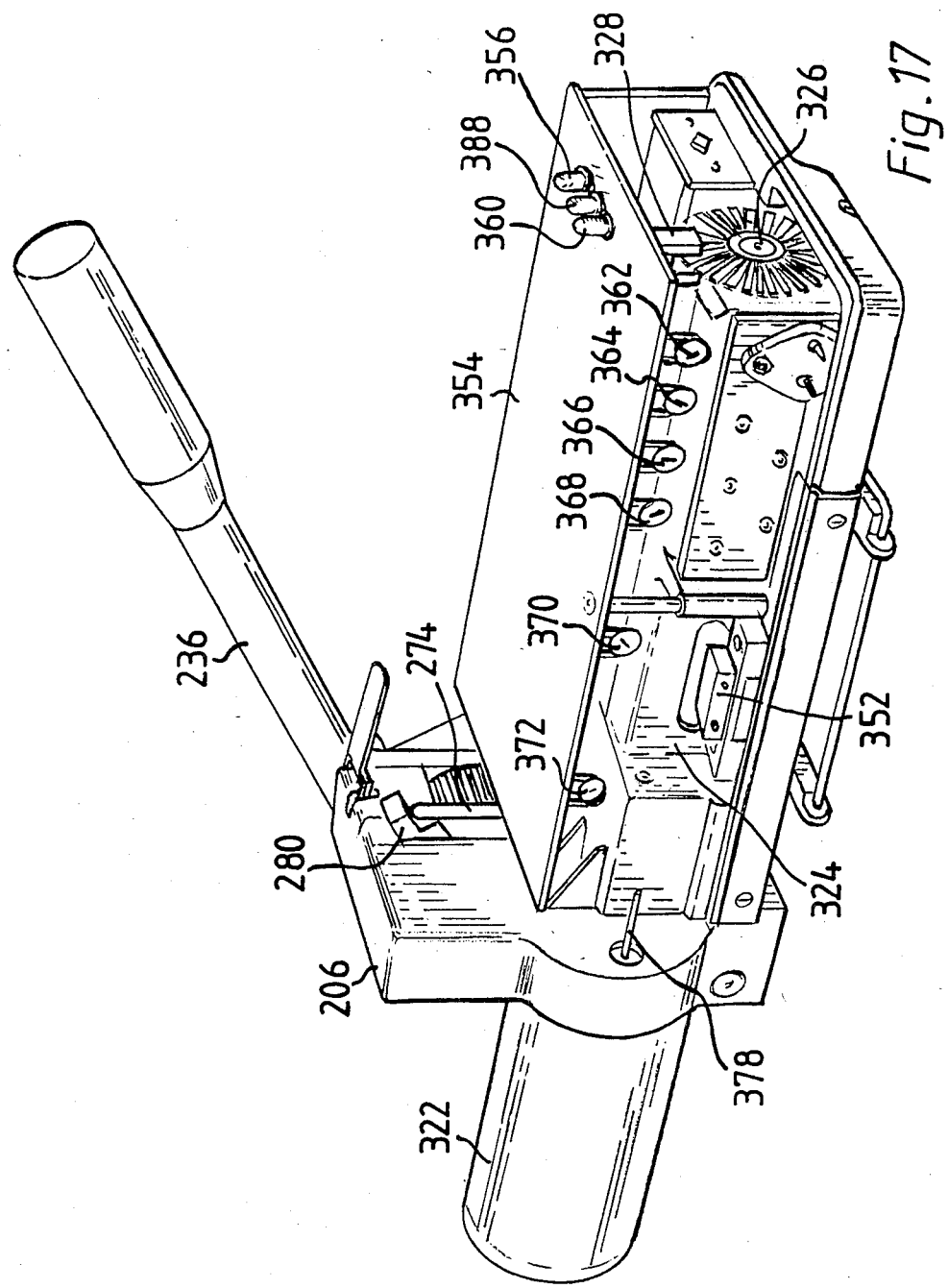
FIG. 17 is a general perspective view of the tool of FIG. 9 with the casing and battery compartment removed.
Figure 18:
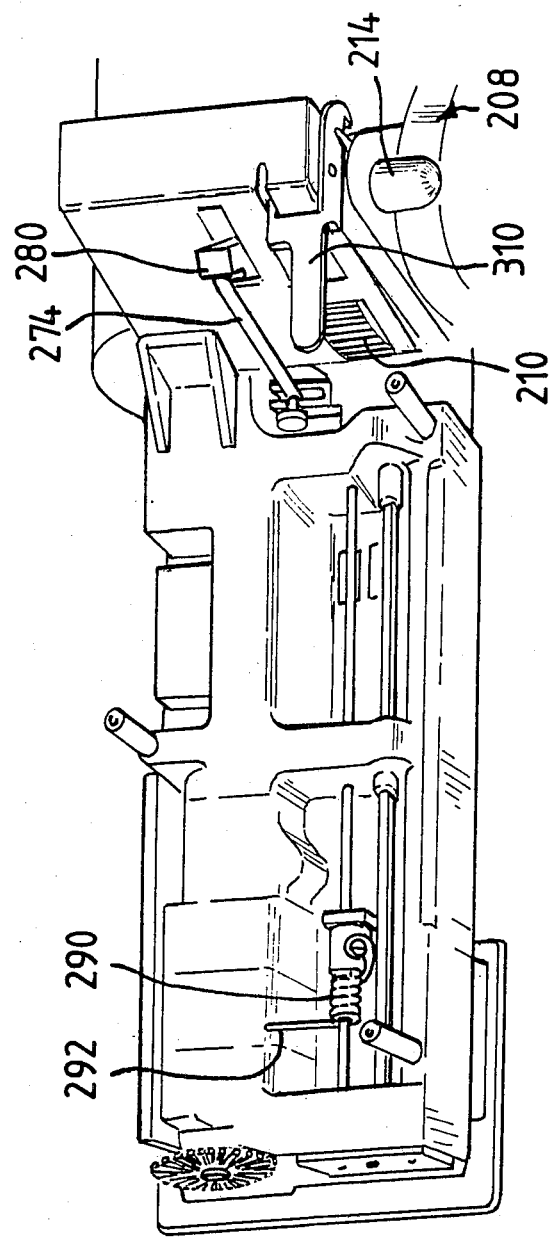
FIG. 18 is a perspective view of the interior of the tool with the printed circuit board removed to allow detail of the internal constructure to be seen.

The upper end of the rod 274 is acted on by a lever 280 which extends rearwardly from the bulkhead 206 and is perhaps best seen in FIG. 17. The lever 280 is pivotable about the same axis as is the subassembly 216, ie about the shaft 214 and although not shown, a clutch mechanism within the bulkhead transmits drive between the lever 236 and the lever 280 only when the lever 236 has adopted the position shown in FIG. 17 or has been pushed below that position in the direction of the arrow 238. The thrust rod 274 can thus be lowered so as to force the plate 256 away from the spring 248 and the lower tape 228 by urging the lever 236 into a generally in-line position, ie approximately parallel to the body 200 of the tool.

The action of the spring 260 serves to return the plate 256 to its elevated closed position as soon as the lever 236 is rotated back to the position shown in FIG. 17 and beyond.

After inserting the two tape lengths laterally it is important that they remain guided so as to remain one above the other along the requisite path through the tool. To this end the inboard edges of the tape lengths run against the cap 276 at the lower end of the rod 274 and at the other end are retained by a step 282 formed in the upper surface of the foot 224 (see FIG. 14). However, there is nothing so far to prevent the tapes from sliding laterally out of the tool, opposite to the direction in which they have been inserted, and to this end, two tape retaining lugs are provided at 284 and 286 respectively (see FIG. 11).

Figure 11:
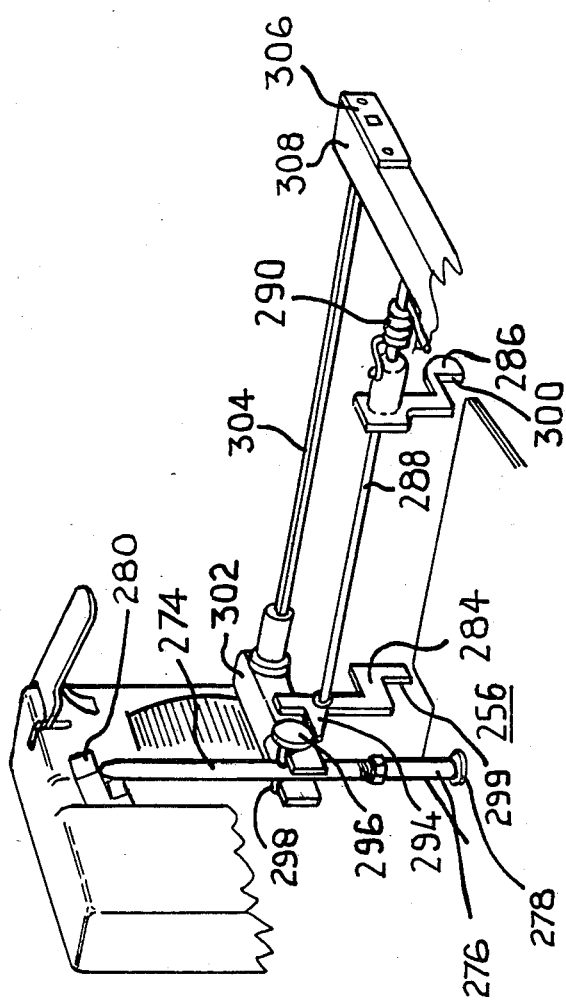
FIG. 11 is a perspective view of part of the mechanism shown in FIG. 10.
Figure 13:
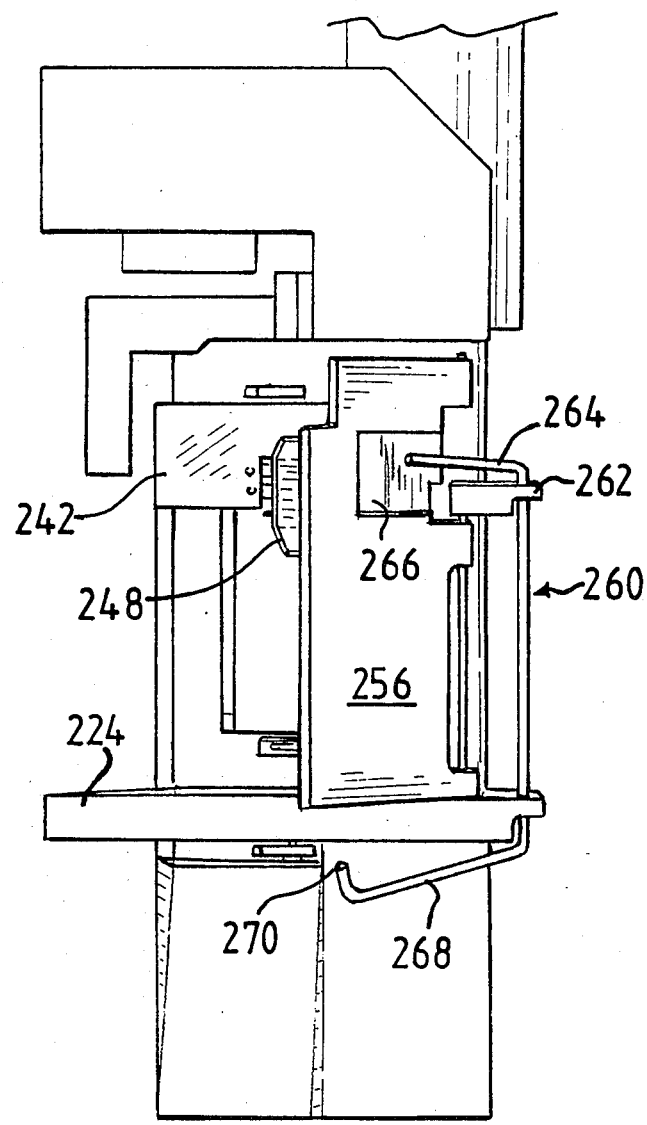
FIG. 13 is an underside view of the tool shown in FIG. 9 with the hingable plate forming part of the underside shown in a partly closed position.

The two lugs are mounted on a rod 288 which is urged in a clockwise direction under the action of a spring 290 fitted on the rod 288 and having an arm extending radially therefrom at 292 to engage the underside of the tool. The effect of the spring 290 is to urge the two lugs in a clockwise direction (as viewed in FIG. 11) and rotation of the lugs beyond the position shown is prevented by means of an arm 294 extending from the lug 284, which arm engages the underside of the head 296 on a pin 298 which extends through the rod 274. The position of the pin and the size of the head 296 are chosen so that when the rod 274 is in its maximum elevated position as shown in FIG. 11, the arm 294 is just horizontal so that the rest of the lug extends generally vertically. However with downward movement of the rod 274, the lug 284 is rotated in an anti-clockwise manner (as viewed in FIG. 11) and with it the rod 288 and lug 286 raising both lugs well clear of the tape path.

Thus during loading of the tape, when the rod 274 has been fully depressed, the tape path is unrestricted but upon releasing the rod 274 and allowing the latter to rise, will cause the rod 288 to rotate under the action of spring 290 and return the two lugs 284 and 286 into the position shown in FIG. 11 in which the lower edge of each of the lugs denoted by reference numeral 298 and 300 respectively just engages the outboard edge of the two tape lengths extending through the tool and serve to retain the tape in alignment and in position within the tool.

To assist in raising the rod 274, the pin 298 is further acted on by a bifurcated member 302 carried at the end of a torsion bar 304 the opposite end of which is clamped at 306 in a transverse frame member of the tool identified by reference numeral 308. The upper edges of the bifurcated member 302 are cut away to form two aligned recesses (not shown in detail) which engage and locate the pin as the latter extends on either side of the rod 274 and the torsion bar is adjusted so as to provide the required degree of lift at the outboard end of the bifurcated member 302 to lift the rod 274 when the lever 236 is rotated out of the horizontal position opposite to the direction shown by arrow 238.

Figure 12:
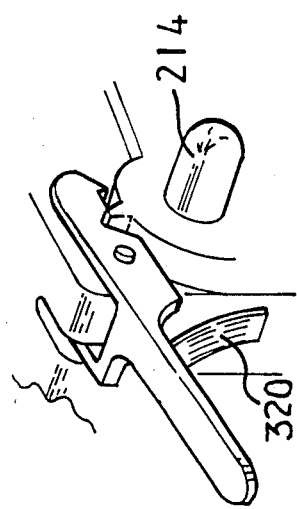
FIG. 12 is a scrap perspective view of part of the front end of the tool shown in FIG. 9.

In order to facilitate the entry of the tape into the tool, the sub-assembly 216 can be held in one of two elevated positions by means of a latch which is best seen in FIGS. 10 and 12. The latch comprises a lever 310 pivoted at 312 which is cut away on its underside to form a deep slot 314 and a shallow slot 316. A tooth 318 protruding from the upper part of the sub-assembly 210 can engage in the shallow slot 316 or in the deeper slot 314. Engagement is achieved by rotating the sub-assembly 216 in the anti-clockwise direction as shown in FIG. 10, so that the tooth 318 lifts the right hand end of the lever 310 (as viewed in FIG. 10) to allow the tooth to enter the cut away region containing the two slots. If the lever 236 (which rotates the sub-assembly 216) is pulled down sufficiently far, the tooth 318 it will engage the deeper slot 314.

A spring 320 secured at its lower end to the bulkhead 206 extends upwardly to engage the underside of the lever 310 to urge the latter in a clockwise sense about the pin at 312. Thus if the lever 236 is pulled backwardly and downwardly to a sufficient extent to cause the tooth 318 to enter the cut away region of the lever 310, the engagement of the tooth in either of the slots would be maintained by the action of the spring 320 urging the lever in a clockwise sense, thus preventing the subassembly from being rotated in a clockwise manner by appropriate lifting of the lever 236. In fact the latter will only be released by depressing the arm of the lever 310 in a downward sense against the action of the spring 320 so as to lift the right hand end of the lever clear of the tooth 318 and allow the sub-assembly 226 to rotate in a clockwise manner.

By providing a deep slot and shallow slot, so three different positions are possible for the sub-assembly 216.

The first of these is shown in FIG. 10 in which the tooth 318 is free of either of the slots and the subassembly 216, shoe 218 and plate 222 are all snugly fitted together so as to trap the two layers of tape as shown.

If the tooth 318 engages the deeper slot 316 (i.e. with the lever 236 fully rotated into its horizontal position), a gap will be found to exist between both the plate 222 and the shoe 218 and between the latter and the underside of the serrated wheel 210 in the sub-assembly 216. In this mode, the end of the tape 232 can be inserted laterally into the tool, and if the lever 310 is then tripped by a small amount to enable the tooth 318 to enter the shallower slot 316, the plate 222 and the shoe 218 are drawn together to grip the length of tape therebetween and hold it in position although the gap between the shoe 218 and the serrated wheel 210 remains.

With the tooth 318 in the slot 316, the upper tape 225 can be inserted and the lever 310 tripped once again to release the tooth 318 completely, thereby causing the serrated wheel to drop onto the tape and trap it against the shoe 218.

In FIG. 10 the heater element is shown at its start position. In accordance with the invention the weld is formed by moving the heater assembly in a rearward direction (to the left in FIG. 10) passing an electric current through the heating element to heat the latter and then returning the heater to its start position whilst the current flows. The two layers of plastics material are then locally heated and bonded together. The mechanism for moving the heater and controlling the supply of electric current thereto is controlled by an electric motor housed within a cylindrical casing 322 (see FIG. 17) having a gear box (not shown) for driving a lead screw (not shown) which extends through a central enclosed casting generally designated 324 from one end of the tool to the other. At the right hand end (as shown in FIG. 17) the lead screw protrudes and provides a mounting for a star wheel 326 which cooperates with an optical encoder 328 so as to enable precise rotational position of the lead screw to be determined.

A nut (not shown) rotatably received on the lead screw and prevented from rotating therewith travels axially parallel to the screw as the latter rotates. Attached to this nut (not shown) is the plate 244 (see FIG. 15) and as the lead screw rotates in one direction so the plate 244 moves in the direction of the arrow 330 (see FIG. 15). Rotation of the lead screw in the opposite sense causes axial movement of the plate 244 and heater attached thereto in the opposite direction to that of arrow 330.

Figure 16:
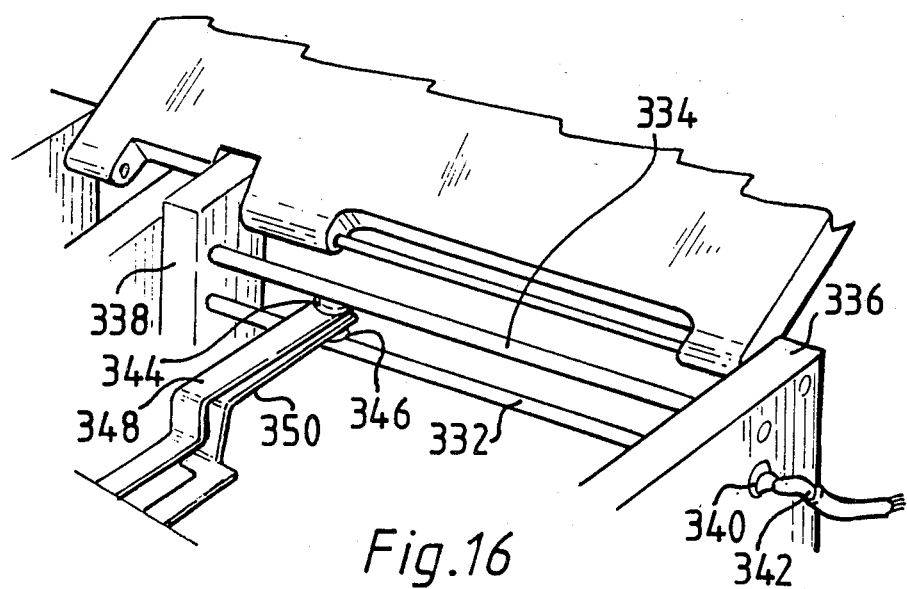
FIG. 16 is a scrap perspective view showing how electric current is conveyed to the heating element.

The heating element requires electric current to this during part of the movement of the heater carriage assembly formed in part by plate 244, and the method by which this is achieved is illustrated in FIG. 16. As shown, two conductive rods 332 and 334 extend between two support members 336 and 338. The upper conductive rod 334 is electrically connected to the supporting members and thereby the frame of the tool and is maintained at the frame potential. The lower rod 332 is supported in insulating bushes as at 340 and electricaly connected thereto is a conductor 342 which is connected via a switching circuit to a battery (to be described) the opposite pole of which is connected to the frame of the tool. Between the two rods 332 and 334 are located a pair of contacts 344 and 346, the former engaging the upper rod 334 and the lower the lower rod 332. The contacts are carried at the end of two electrically conductive spring arms 348 and 350 respectively which are electricaly insulated from one another and are connected to opposite ends of the heater assembly. The natural resilience of the two arms 348 and 350 urges the contacts 344 and 346 into running contact with the rods 332 and 334 and the wiping action of the contacts relative to the rods tends to clean the surfaces and maintain good electricaly contact and low resistance.

The position of the carriage assembly along the length of the lead screw must be accurately determined and to this end a microswitch 352 is provided which is closed when the carriage is in its start position. The start button 204 (described with reference to FIG. 9) overrides the effect of the microswitch 352 and movement of the carriage thereafter, caused by rotation of the lead screw, is monitored very accurately by decoding the pulses received from the encoder 328 as will be described later.

Control circuits for controlling the current to the motor and to the heater are contained on a printed circuit board 354 carried within the housing 200 and mounted thereon are three indicator lamps 356, 358 and 360, the function of which will be described later.

Also carried by the printed circuit board are various potentiometers identified by reference numerals 362, 364, 366, 368, 370 and 372. The precise function and purpose of the potentiometers will be described later.

Figure 19:
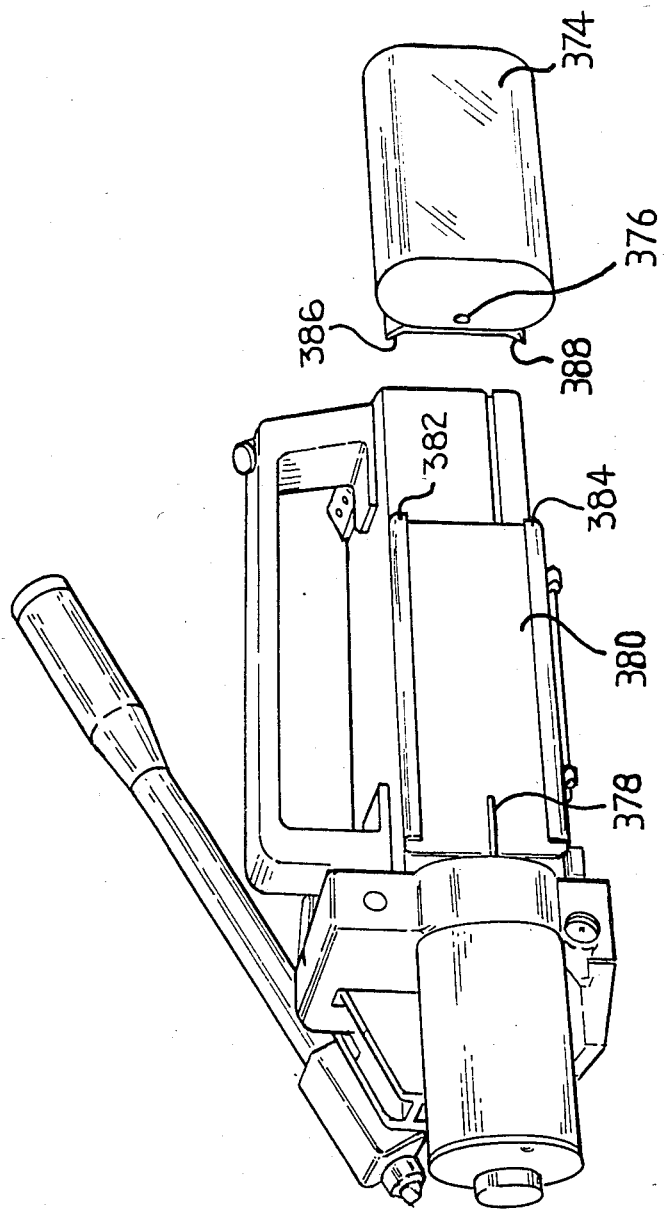
FIG. 19 is a general perspective view of the tool shown in FIG. 9 but viewed from the other side and with the battery compartment removed.

Referring now to FIG. 19, rechargable batteries are contained within a battery housing 374 and electrical contact from the batteries to the apparatus is achieved by the conductive housing containing the batteries and an insulated conductive sleeve 376 into which a conductive pin 378 automatically fits as the battery housing is located in position. The housing is retained on the body by means of a track 380 having inturned edges at 382 and 384 below which are received spring flaps 386 and 388 respectively on the rear of the battery housing.

Although not shown, means is provided for recharging the batteries after the battery pack 374 has been removed from the tool.

Figure 20:
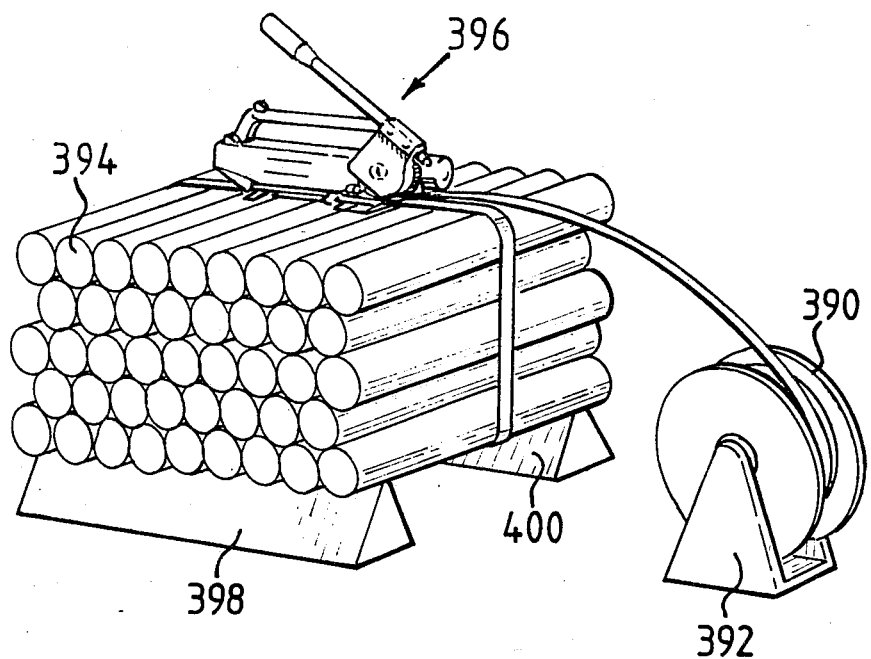
FIG. 20 is a general perspective view showing the tool in use for welding a loop of plastic strap material around a bundle of elongated tubes.

FIG. 20 shows how the tool is employed in use in conjunction with a spool of tape 390 rotatably mounted on a carriage 392. The tape is shown having been looped around a bundle of tubular members one of which is shown at 394 and after perfecting the weld in the manner to be described, the tape is severed and the tool generally designated 396 and the flying end of the tape from the spool 390 can be relocated over another package ready to strap bind the latter.

For ease of handling, the assembly of items 394 is shown mounted on two platforms 398 and 400 to allow a forklift to be positioned thereunder after strapping to facilitate removal.

Severance of the welded section of the tape from the end of the tape leading to the reel is achieved by a second heating element located within the tool which is moved in a downward direction into engagement with the upper tape and heated automatically after the weld has been completed so as to enable the tool and length of tape leading to the reel to be separated from the welded loop of tape. Although not shown in detail the cutter is similar to that shown at item 54 in FIG. 3 of the drawings and described with reference to the first illustrated embodiment.

It will be appreciated that if the cutter is maintained lightly in contact with the upper tape it is not in fact necessary to move the cutter element to achieve severance but merely sufficient to cause an electric current to flow therethrough to heat the cutting element sufficiently to cause the upper tape to melt and sever.

Figure 21:
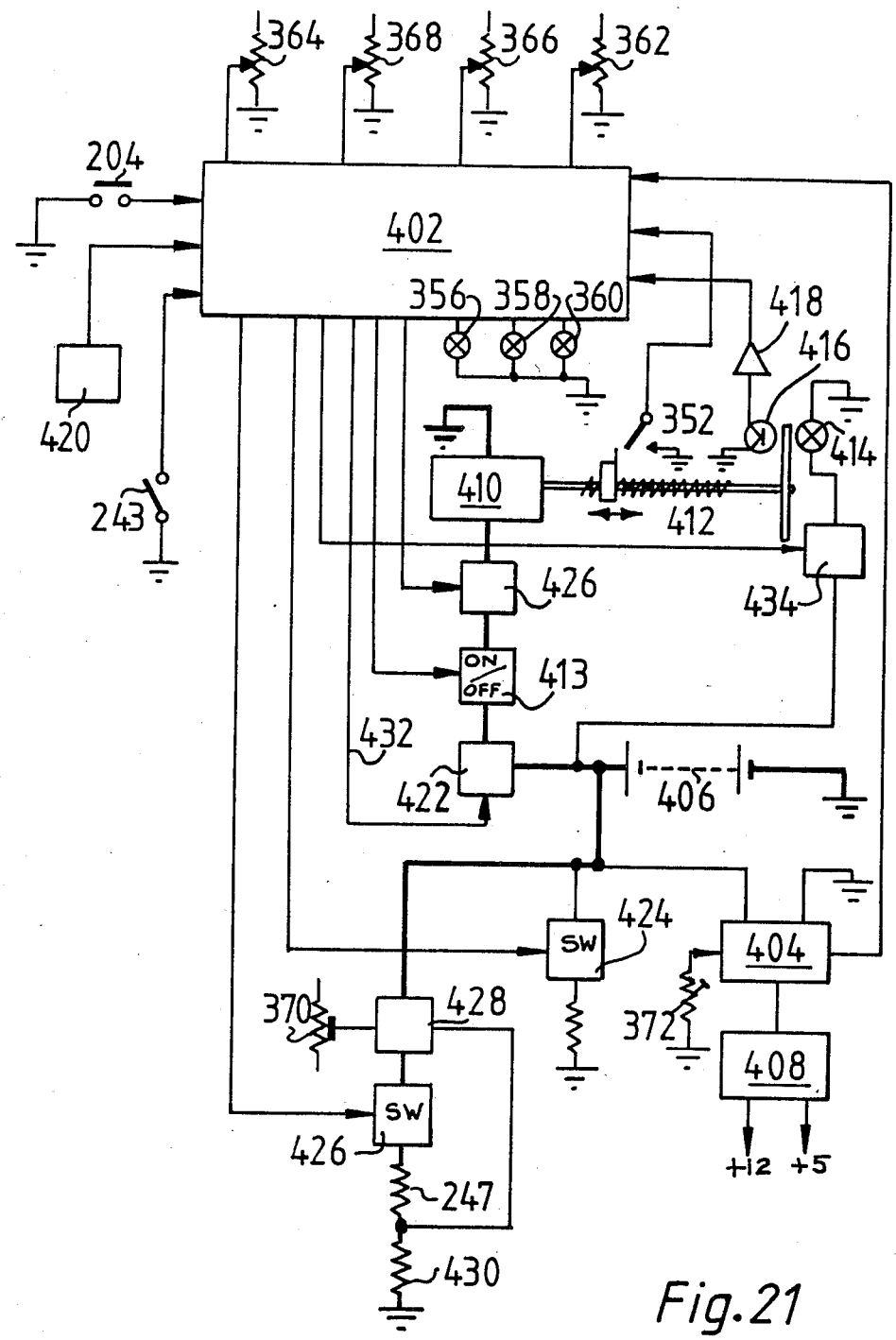
FIG. 21 is a block circuit diagram of a control system for controlling the operation of a strap welding tool shown in FIGS. 9 to 20.

In the system shown in FIG. 21 the tool is primed by loading strap into the tool as described in relation to FIGS. 9 to 20. This closes the strap sensor microswitch 243 (see FIG. 10).

With switch 243 closed, the processor 402 performs a power up cycle and if completed successfully, generates a control signal to turn ON the ready lamp 356 indicating the tool is ready for use.

The welding cycle is initiated by depressing the START switch 204 (see FIG. 9). It should be noted that if this switch is depressed without the strap having been put properly into the tool, the microprocessor will not have performed the power up cycle and the tool will not be capable of operating the welding cycle. This is important since if no strap is present in contact with the heating element 246 (see FIG. 10) the latter would rapidly overheat and burn out if the welding cycle were to proceed.

During the power up cycle the battery voltage is sensed and if too low the sequence is aborted and a control signal is produced by the processor 402 to cause indicator lamp 360 to light. In fact if at any time during a welding cycle, assuming the latter is successfully initiated, the battery voltage should drop below a given threshold, the operation will be aborted and the lamp 360 will be illuminated indicating LOW BATTERY. This is just as important as preventing the operation of the tool in the absence of the strap, since if the battery voltage is insufficient, the current may not be adequate to heat the strap and cause correct fusion of the plastics material thereby resulting in an inferior weld.

Battery voltage is sensed by a microprocessor circuit 404 connected to one pole of the battery 406. A threshold voltage with which the battery voltage is compared, is set by a factory preset potentiometer 372 also shown in FIG. 17.

A voltage generating and voltage stabilising circuit 408 is controlled by an output from microprocessor controlled circuit 404 to produce a stabilised voltage supply (typically five volts) for the microprocessors and other logic and signal processing devices, together with a stabilised voltage supply (typically twelve volts) to provide the reference voltage with which the battery voltage can be constantly compared.

After the switch 204 is closed, and assuming no abortion at the outset, the microprocessor circuit 402 checks to see if microswitch 352 is closed.

If it is, the system knows that the heater assembly is at its start position, and the welding motor can be powered up.

If microswitch 352 is not closed, the processor 402 produces a motor drive signal to rotate the lead screw 412 and move the heater assembly until microswitch 352 is closed (ie the heater assembly is in its start position).

Once switch 352 is closed and no fault condition otherwise shows, a control signal is produced to trigger switch 413 ON and supply power to the motor 410 to drive the lead screw 412 and move the heater assembly away from its start position. Since at this stage the object is to move the heater assembly as quickly as possible full power is provided to the motor to move the heater carriage as quickly as possible.

The distance moved by the heater assembly is determined by counting the pulses generated by the interruption of a light beam from a light emitting diode 414 to a light sensitive semiconductor device 416, the interruption being achieved by the rotation of the star wheel 326 (see FIG. 17) which together with the lamp and light sensitive semiconductor device comprises the shaft encoder. The pulses from the encoder are amplified and shaped by an amplifier 418 before being applied to the microprocessor 402.

The latter is not only supplied with these pulses but also receives timing pulses (referred to as clock pulses) from a crystal controlled oscillator 420. The clock pulse frequency is high compared with the frequency of the pulses from 416 and the processor is programmed to count the number of clock pulses for each pulse from the encoder 414/416. This number is compared with numerical values held in the processor memory and controlled by setting a potentiometer 362.

If the number of clock pulses during any phase of carriage movement is too high (meaning the motor speed is too low probably due to a fault or a jam) the system aborts and lamp 358 will be made to flash. Likewise, if the number is too low, (meaning the motor speed is too high (probably due to a fault)) the current to the motor is reduced by a control signal to current controller 422. (Alternatively further operation may be inhibited by turning OFF the switch 413 and the weld cycle is aborted with lamp 358 flashing to indicate a fault).

The potential from potentiometer 362 is converted by the processor into a digital value for comparison purposes.

Assuming motor speed is correct the processor 402 counts the pulses from the encoder.

The accumulating value indicates the displacement of the heater assembly away from its start position.

Control of the movement of the heater assembly and heater current is governed by a comparison of the accumulating value with a series of target values stored in the processor memory.

The position of maximum displacement of the heater assembly is determined by a final target value. This is computed by the processor from a look up table stored in its memory by comparing a digital value derived by the processor from the setting of potentiometer 364, which is calibrated to indicate weld length required. The look up table contains numerical final target values for the shaft encoder pulse count to give sufficient return movement of the heater to achieve the desired weld length as set up by 364.

The processor contains five further target values for each final target value, namely a slow down target value, a heater-on target value, a heater-off target value, a slow before cut target value and a cut position target value.

Within the processor the accumulating value of pulses from 416 is continually compared with the target values dictated by 364 and when the accumulating number of encoder pulses reaches the slow down target the processor generates a first control signal which is supplied to circuit 422 to limit the motor current and reduce the motor speed to a crawl. This prevents overshoot when the motor is stopped and reversed at the end of the forward stroke.

When the accumulating number of encoder pulses reaches the heater on target value the processor generates a second control signal to trigger circuit 424 and connect the battery 406 to the heater element 246, causing the latter to heat up.

When the accumulating value of the encoder pulses equals the final target value set by 364, the processor triggers circuit 426 to reverse the motor current and drive the heater assembly in the opposite sense back toward the start position, whilst maintaining the current to the heater element.

The speed at which the motor operates during each phase of the cycle is determined by information stored in the processor memory, which is adjustable by the setting of potentiometer 362, modified at all times by the state of the battery by feedback from processor 404.

The processor 402 counts the encoder pulses received during the reverse travel, when the count value equals the heater off target value the processor controls switch 424 OFF to remove the heater current and generates another control signal for 422 to reduce the motor current to drive the motor to its home position at half speed, again to prevent overtravel.

When switch 352 is actuated for the first time, the processor 402 knows that the initial welding sequence has been completed.

The second part of the welding cycle involves the severance of the strap from the welded loop and this is achieved by the processor 402 generating a further series of control signals as follows.

After an initial time period set by potentiometer 366, the processor generates control signals for circuit 413, 426 and 422 to drive the motor 410 in the forward direction again. The encoder pulses are counted as the motor drives the lead screw 412 and when the new accumulating number of encoder pulses reaches the "slow before cut" target value the processor 402 generates a further control signal for 422 to reduce the motor current and thereby motor speed to a crawl to avoid overtravel at the severance point.

When the new accumulating pulse count reaches the "cut position" target value, (meaning that the heater assembly has reached the point at which the strap is to be cut) microprocessor 402 produces a control signal for circuit 426 to switch on the current to the cutter element 247. This control signal lasts for a period of time referred to as the "cut time" determined by the setting of potentiometer 368.

The magnitude of the current which flows through the cutter element is in fact determined by a factory preset potentiometer 370 acting on a current controlling circuit 428 and a feedback resistor 430 provides a signal to govern the current controlling circuit 428 so as to produce a constant heating effect at the cutting stage.

After the "cut time" has elapsed, and the current to the cutter element has been switched off, the microprocessor 402 produces a further control signal to 422, 413 and 426 to reverse the direction of the motor and drive the motor back to the home position which is determined when 352 is actuated for the second time.

At that stage the welding cycle is completed and a visual indication of this is achieved by causing lamp 358 to illuminate.

Although the magnitude of the current to the motor may be controlled in a number of different ways, preferably the circuit 422 serves to chop the direct current from the battery 406 into pulses of constant height but whose pulse width is controlled in dependence on the current control signal from microprocessor 402 along line 432. By reducing the pulse width so the mean current available to the motor 410 is reduced and the speed likewise is reduced and vice versa.

The circuit 422 can thus essentially comprise a semiconductor switch which is controlled ON and OFF repetitively to produce the chopping action. It will be appreciated that the circuits 413 and 422 can in that event be combined.

The circuit 426 is conveniently a semiconductor bridge circuit in which the different branches of the bridge can be rendered conducting or non-conducting by firing and inhibiting the semiconductor devices located therein as required.

In this event these control signals to the circuit 426 from the processor 402 are arranged to fire the devices in one half of the bridge (and turn off the devices in the other half) to produce rotation in one direction and to fire the devices in the said other half and inhibit those in the first half, to produce rotation in the opposite direction.

Switch 434 controls the supply of current to the light emitting device 414 in the shaft encoder.

It will be appreciated that the arrangement described with reference to the drawings may be modified in various ways within the scope of the invention hereinbefore defined.

We claim:

1. In apparatus for heat sealing thermoplastics strap material comprising a portable tool adapted to receive two sections of strap material which are to be welded together and having a heating element, drive means for moving the heating element between the straps and a battery source for supplying heating current to the heating element;
   the improvement comprising:
   control circuit means for detecting the battery voltage on load and producing a speed control signal, and
   drive control means responsive to the speed control signal to control the speed of movement of the heating element between the straps in dependence on the detected voltage level.

2. Apparatus for heat sealing thermoplastics strap as set forth in claim 1, wherein there is provided a shaft encoder associated with the drive to the heater element from which encoder electrical pulses are obtained, the frequency of which being proportional to the speed of the drive motor and the number of which have been received after the heater element has left its home position being proportional to the distance moved by the heater element.

3. Apparatus for heat sealing thermoplastics strap as set forth in claim 2, wherein the improvement comprises:
   comparison means for comparing electrical signals corresponding to the detected battery voltage and the detected motor speed, and
   circuit means associated with the drive control circuit and responsive to the comparison, to control the motor speed and to compensate for reducing battery voltage.

4. Apparatus for heat sealing thermoplastics strap as set forth in claim 2, wherein the improvement comprises a carriage assembly on which the heater element is mounted, the carriage being driven by the drive motor, and switch means operated during movement of the carriage assembly to turn the heating current on and off during the movement thereof.

5. Apparatus for heat sealing thermoplastics strap as set forth in claim 2, wherein the improvement comprises:
   a travel switch operated when the heating element leaves its home position,
   a pulse counter for counting the pulses derived fom the shaft encoder after operation of the travel switch, and
   switch means for controlling the flow of heating current and operated ON and OFF by signals generated when the count reaches predetermined numerical values.

6. Apparatus for heat sealing thermoplastics strap as set forth in claim 5, wherein the motor speed and direction are changed during the reciprocal motion of the heater element at points along the heater element path when the numerical value of the count in the pulse counter equals certain predetermined values, and the motor is stopped when the travel switch is operated as the heater element returns to its home position.

7. Apparatus for heat sealing thermoplastics strap as set forth in claim 4, wherein the improvement comprises:
- a cutting device within the apparatus for severing the free end of the strap from the loop formed by the seal, and
- circuit means for controlling the supply of operating current to the cutting device during a second excursion of the heater carriage assembly from its home position which places the heater assembly below the cutter device to serve as a reaction member therefor.

8. Apparatus for heat sealing thermoplastics strap as set forth in claim 7, wherein the improvement comprises circuit means responsive to actuation of the travel switch to introduce a predetermined pause in the motion of the carriage assembly after a seal has been made, to allow the latter to set before a cut is effected.

9. Apparatus for heat sealing thermoplastics strap as set forth in claim 1, wherein the improvement comprises switch means actuated only when strap has been loaded into the apparatus and adapted to inhibit at least the heating current unless strap is in place.

10. Apparatus for sealing thermoplastics strap as set forth in claim 5, wherein the switching device comprises a semiconductor device.

11. Apparatus for sealing thermoplastics strap as set forth in claim 1, wherein the improvement comprises clamping means by which the two lengths of strap can be separately clamped in position in the apparatus, whereby one of the two lengths can be inserted and clamped in position independently of the other.

12. In a method for heat sealing thermoplastics strap material comprising the steps of:
- inserting into a portable tool containing a heating element, two sections of strap material which are to be welded together, and locating the strap sections above and below the heating element;
- driving the heating element in a reciprocal motion between the straps;
- supplying electric power to the element from a battery source during the reciprocal motion to heat and fuse the two straps;

the improvement comprising the steps of:
- detecting the battery voltage on load, and
- controlling the speed of the heating element between the straps in dependence on the detected voltage level.

13. A method for heat sealing thermoplastics strap as set forth in claim 12, wherein the improvement comprises the steps of:
- driving the heating element by means of an electric motor;
- detecting the motor speed and generating an electrical signal proportional thereto by counting pulses produced as the motor rotates;
- forming digital equivalents of the pulse count and the battery voltage; and
- comparing the digitised electrical signals to produce a speed control signal, and controlling the motor speed by the speed control signal, to compensate for variation in battery voltage.

14. A method for heat sealing thermoplastics strap as set forth in claim 12, wherein the improvement comprises the steps of:
- operating a travel switch when the heating element leaves or returns to its home position;
- rotating a shaft encoder as the heating element is moved,
- counting the pulses derived from the shaft encoder after operation of the travel switch, and
- controlling the flow of heating current ON and OFF when the number of pulses counted by the pulse counter reaches predetermined numerical values.

15. A method for heat sealing thermoplastics strap as set forth in claim 16, wherein the improvement comprises the steps of:
- driving the heating element so as to perform a second excursion from its start position, to move the heating element below a cutting device to serve as a reaction member therefor and
- supplying operating current to the cutting device to sever the strap in contact therewith.

16. A method for heat sealing thermoplastics strap as set forth in claim 15, wherein the improvement comprises the further step of halting the motion of the carriage assembly for a predetermined pause period after a seal has been made to allow the latter to set, before the cutting device is actuated.

* * * * *